United States Patent [19]

Mouftah

[11] Patent Number: 4,509,164
[45] Date of Patent: Apr. 2, 1985

[54] MICROPROCESSOR BASED DIGITAL TO DIGITAL CONVERTING DATASET

[75] Inventor: Hussein T. Mouftah, Kingston, Canada

[73] Assignee: Queen's University at Kingston, Ontario, Canada

[21] Appl. No.: 325,967

[22] Filed: Nov. 30, 1981

[51] Int. Cl.³ .......................................... H04M 11/00
[52] U.S. Cl. .................................................... 370/29
[58] Field of Search ..................... 370/24, 29; 375/8; 179/2 DP

[56] References Cited

U.S. PATENT DOCUMENTS

| | | | |
|---|---|---|---|
| 3,764,977 | 10/1973 | Weeden, Jr. ........................... | 375/8 |
| 3,975,712 | 8/1976 | Hepworth et al. ................... | 370/24 |
| 4,101,833 | 7/1978 | Bingham et al. ..................... | 375/8 |
| 4,200,936 | 4/1980 | Borzcik et al. ...................... | 375/8 |

FOREIGN PATENT DOCUMENTS 84065 12/1979 Japan ............................... 179/2 DP

OTHER PUBLICATIONS

"MC6850 Asynchronous Communications Interface Adapter", Motorola Microprocessor Applications Manual, 1975, pp. 3-21-3-28.
L. Smith, "USART-A Universal μP Interface for Serial Data Communications", EDN Magazine, Sep. 5, 1976, vol. 21, No. 16, pp. 81-86.
"MX2400 Data Modems User Manual", Codex Corp., Jun. 1979, pp. 1-1, 1-3.
S. Huon et al., "Network Problem-Determination Aids in Microprocessor-Based Modems", IBM J. Res. Develop., vol. 25, No. 1, Jan. 1981, pp. 3-16.

Primary Examiner—Douglas W. Olms
Assistant Examiner—Wellington Chin
Attorney, Agent, or Firm—Lowe, King, Price & Becker

[57] ABSTRACT

A microprocessor based, digital to digital converting, full duplex time division multiplexing data set operating in burst mode transmission interfaces a data terminal to a communication path for communicating with another data terminal. The data set includes a transmitter, a receiver, a controlled transmit/receive switch, digital logic control circuitry, and a microprocessor for communicating with and controlling the other elements thereof. Communication is based on a bipolar code, and bipolar violation encoding is used to signal special messages. Control words, indicated by bipolar violations, are generated within one data set and transmitted to another data set as a preamble to a bipolar violation for communicating information to, and controlling operation of, the other data set. Special start and stop bits are generated by the data set before and after each fixed length data block for clock synchronization and DC balancing, and are stripped from the data clock by the receiving data set. Circuitry is also provided for generating a DC balance bit within each preamble to a bipolar violation. Specific logic circuits and control programs cooperate in providing system operation.

40 Claims, 15 Drawing Figures

MICROPROCESSOR BASED DIGITAL TO DIGITAL CONVERTING DATASET

TECHNICAL FIELD

This invention relates to data transmission sets, and more particularly to such datasets operating as interfaces providing full duplex digital communication between a data terminal and a communication network. The network may be a public network or a private line, in which a similar interface is provided for at least one other data terminal. The invention still more specifically relates to microprocessor based interfaces for transmitting and receiving data to and from the communication network in high speed, fixed length data bursts representing communication with a data terminal at slower rates.

BACKGROUND ART

Two wire full duplex transmission of data, as performed in prior art devices, typically relies on the use of hybrids, or on frequency multiplexing.

The use of hybrid circuits, however, is expensive and, additionally, may cause echos which must then be eliminated by the use of echo cancelling circuits. The use of frequency multiplexing for such transmission requires the separation of the two directions of transmission by the use of two different frequency bands. Accordingly, expensive filters are required. Both types of prior art systems thus include deficiencies with respect to transmission of digital signals, for example.

Various systems utilizing time division multiplexing are known.

For example, Evenchik U.S. Pat. No. 4,171,467, Eggimann et al U.S. Pat. No. 3,633,172 and Lutz et al U.S. Pat. No. 3,974,339 all pertain to communication systems. The Evenchik disclosure teaches the use of a single pair of wires to interface a data and a voice communication circuit using bipolar bit pair coding. The Eggimann patent provides time compression in address-coded signaling in which discrete information packets are time position modulated. Finally, the Lutz patent further provides two-wire time division multiplexing in a telecommunications network.

None of the references, however, provide a microprocessor based communication system having the advantages provided herein.

In providing a functional data transmission set, it is desirable to provide storage for the transmitted information both before its transmission and after its reception. For example, information from a source terminal may be entering the dataset simultaneously with the reception of information from the transmission line. The data to be transmitted must be stored until the dataset is ready to transmit. Further, the dataset must have sufficient intelligence to determine when to switch from the transmission to the receiving mode, and vice versa. Moreover, the desirable system should be able to generate control words in order to communicate with a separate similar system, and to provide error checking functions.

None of the prior art provides these features.

DISCLOSURE OF INVENTION

It is accordingly an object of the present invention to provide a microprocessor based dataset for communicating in a full duplex, burst mode time division multiplexing over a single pair of wires with a similar such set.

An additional object of the invention is the provision of a microprocessor controlled dataset capable of generating control words for communication with a remotely located similar such dataset.

It is yet another object of the invention to provide a digital-to-digital conversion data communication set including a capability for generation and reception of start and stop bits for synchronizing the receiving and transmitting units and for maintaining a DC balance on the transmission lines.

It is still a further object of the invention to provide a data communication set in which bipolar violation signaling is used for transmitting control words from one set to another, as well as for transmitting particular sequences of message data.

Yet another object of the invention is the provision of apparatus for substitution of particular preambles to a bipolar violation bit for sequences of consecutive zeros or consecutive ones, in order to enable block recovery even when consecutive zeros are transmitted and in order to reduce the average signal energy when consecutive ones are transmitted.

Still another object of the invention is the transmission of a DC balancing bit within a preamble to a violation bit in order to maintain a DC balance on the line irrespective of the number and polarity of bipolar violation bits transmitted in a particular data block.

Yet another object of the invention is the provision of a microprocessor controlled dataset, including a transmitting portion and a receiving portion, a digital control logic circuit, and a microprocessor for controlling the logic and the transmitting and receiving portions to provide appropriately timed data transmission and reception.

In accordance with these and other objects, the present invention provides a digital to digital converting communication interface in which a transmitter section and a receiver section communicate with a high speed data line through a transmit/receive controlled switch. Digital control logic circuitry is provided for performing various functions required for proper operation of the device in accordance with the foregoing objects. A microprocessor is provided, as is a first serial synchronous data adapter (SSDA) enabling communication between the control logic and the microprocessor, and a peripheral interface adapter (PIA) for transmitting various signals between the microprocessor and the control logic. A second SSDA is provided for enabling communications between the microprocessor and external data terminals.

BRIEF DESCRIPTION OF THE DRAWING

The foregoing and other objects, features and advantages of the present invention will be more readily appreciated upon reference to the following disclosure when taken in conjunction with the accompanying drawing, in which.

BEST MODE FOR CARRYING OUT THE INVENTION

Figure 1A:
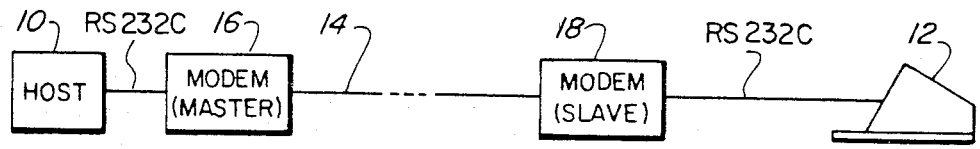
FIGS. 1a and 1b represent two environments applicable to the invention dataset interface.
Figure 1B:
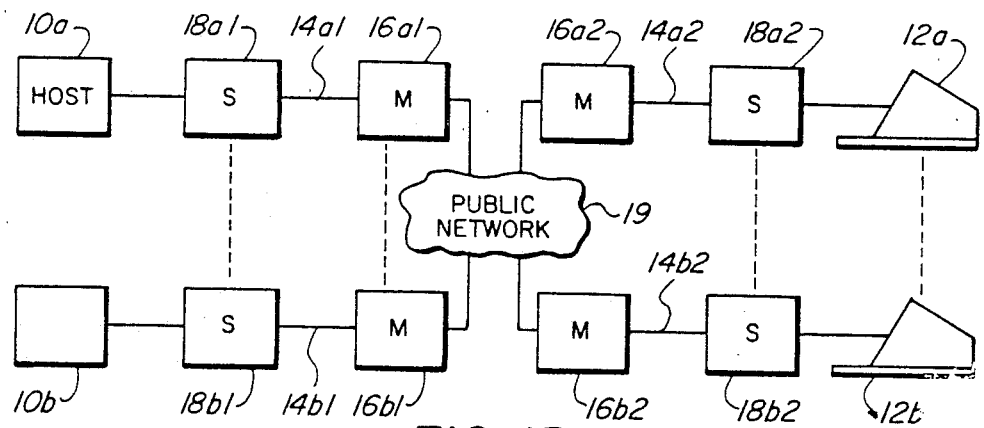

Referring now to FIGS. 1a and 1b, a typical environment for the inventive dataset is shown as including either a private line, shown in FIG. 1a, or a public network, shown in FIG. 1b. In FIG. 1a, a host computer 10 is shown as communicating with a user terminal 12 over a private, two-wire line 14. A pair of base band modems 16 and 18, each embodying the inventive datasets, are shown connected to host computer 10 and user terminal 12, respectively, by standard interfaces of the type RS232C.

Modem 16 is a master modem unit with timing controlled by host computer 10. Modem 16 transmits data at predetermined times, and in that respect controls response timing for the modem 18, which is represented as a slave modem unit in the diagram. It is to be understood that a number of user terminals 12, not shown in the figure, may be connected to modem 18 for multiplexed communication with host computer 10.

In an alternative environment, the modems of the present invention may be used in conjunction with a public network 19. In this environment, system timing is controlled by central clocks at the network offices, so that both the set of host computers 10a . . . 10b and the set of terminals 12a . . . 12b are provided with slaved modems 18a1 . . . 18b1 and 18a2 . . . 18b2, respectively. The slave units communicate with master units 16a2 . . . 16b2 and 16a1 . . . 16b1 over lines 14a2 . . . 14b2 and 14a1 . . . 14b1. Timing and synchronization of data transmission on each line is controlled by the master unit associated therewith, the master unit timing being controlled by the public network as previously described.

By providing a single, centralized timing control, all master units are caused to transmit simultaneously, thereby avoiding near-end crosstalk. Specifically, inasmuch as all master units transmit simultaneously, the receiver portions of each of the masters are therefore simultaneously disabled. Thus, any crosstalk from a transmitting master on a first line to a second line will not affect the master modem associated with the second line, since the receiver portion of the second modem is disabled.

The use of microprocessor controlled datasets in accordance with the present invention for the master and slave units of FIGS. 1a and 1b permits the desired full duplex communication over a high speed two wire line 14. Specifically, terminals communicating at data rates up to 9.6 kilobits per second (KB/s) may be fully duplexed over a two wire, 24 KB/s transmission line using a burst interleaved time compression technique of data transmission as provided by the present invention.

THE INVENTIVE STRUCTURE

Figure 2:
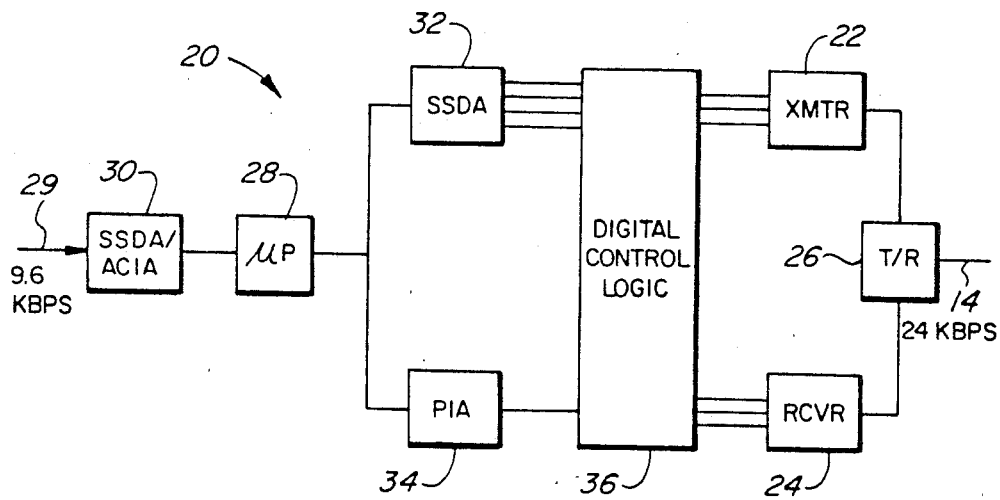
FIG. 2 shows a block diagram representation of the several components forming the inventive dataset.

Referring now to FIG. 2, a base band modem incorporating the present invention is generally shown at 20. The modem 20 may be used either as a slave modem 18 or as a master modem 16, as shown in FIGS. 1a and 1b. The modification necessary to operate the modem as a master or as a slave are described in greater detail with reference to the transmitter, shown in FIG. 4.

As is seen in FIG. 2, the inventive modem includes transmitting and receiving portions, having a transmitter 22 and a receiver 24, connected by a transmit-receive (T/R) switch 26 to the high speed, two wire data line 14. T/R switch 26 may be a type 4066 chip. The unique features of the present modem are provided by use of a programmable micrprocessor 28, such as model MC 6800 available from the Motorola Company, for controlling the transmitting and receiving operations in a manner to be described below.

Microprocessor 28 communicates with either the host computer or a data terminal over a 9.6 KB/s interface 29 through a first serial synchronous data adapter (SSDA) 30, such as is available from Motorola under chip designation MC 6852, for example. In modems designed for asynchronous communication with a host or a data terminal, SSDA 30 may be replaced by an asynchronous communication interface adapter (ACIA). The ACIA, as part of its function, adds and removes start and stop bits for message characters at the transmitting and receiving portions of the operating sequence.

A second SSDA 32 is used to transfer data, clock signals and other handshaking signals between microprocessor 28 and the transmitter portion 22 and the receiver portion 24. A peripheral interface adapter (PIA) 34, available from Motorola as chip MC 6821, for example, communicates a number of control signals between the microprocessor 28 and a digital control logic circuit 36.

Digital control logic circuit 36 includes a number of circuits for controlling the transmitter and the receiver, as well as for enabling and clocking SSDA 32. Such control of SSDA 32 permits SSDA 32 to communicate with the microprocessor 28 at a first, slow rate and in a first, parallel format, while communicating with the transmitter 22 and receiver 24 in a second, fast rate and in a second, serial format.

TRANSMITTER UNIT

Figure 3:
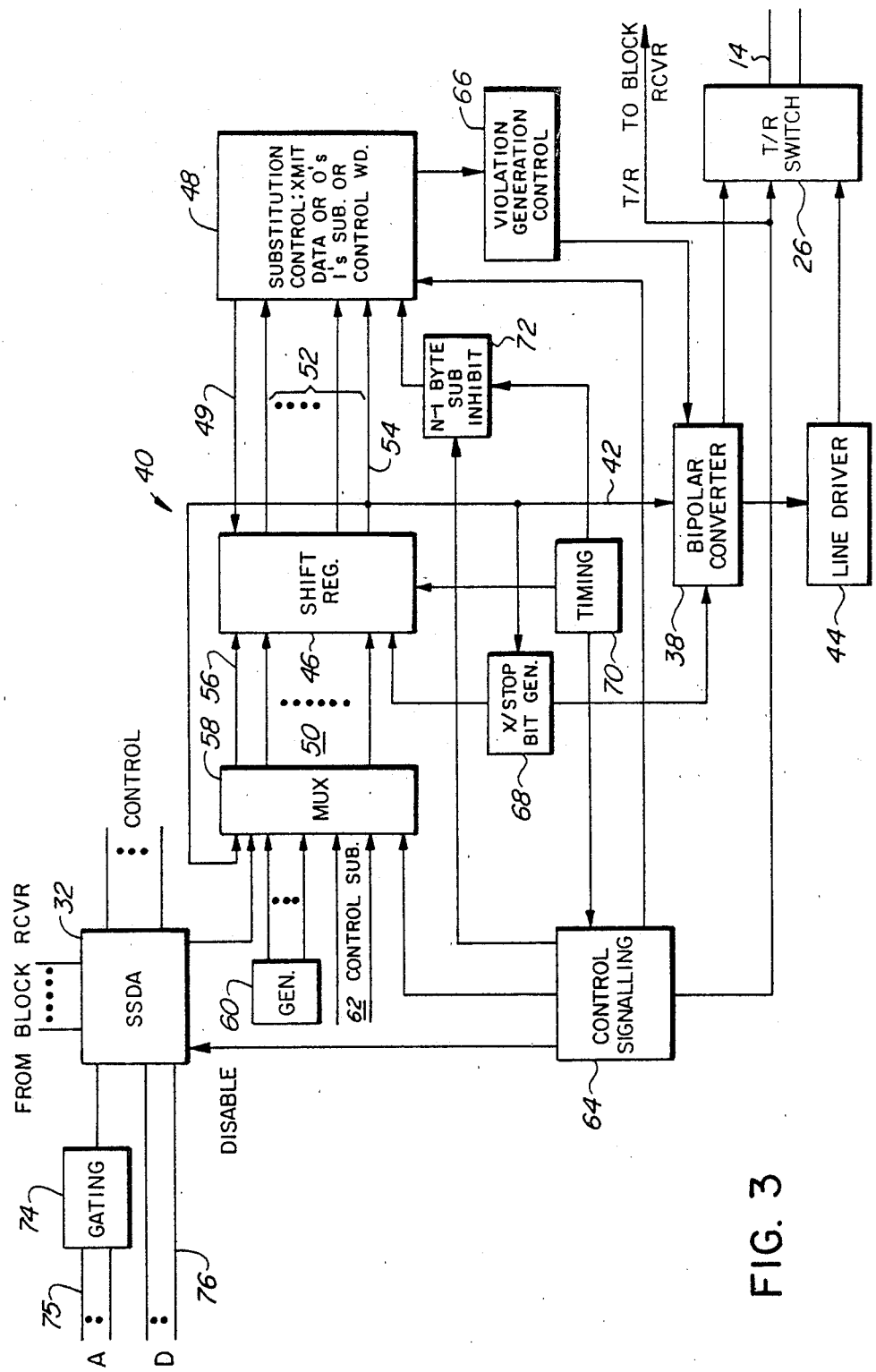
FIG. 3 shows a block diagram representation of the transmitter portion of the dataset of FIG. 2.

The individual components of the inventive modem or dataset shown in FIG. 2 are shown in greater detail in the remaining figures. Specifically, FIG. 3 shows, in block diagram, the communication between the second SSDA 32, the microprocessor 28, the transmitter portion and the appropriate digital control logic associated therewith.

One feature of the inventive structure is the use of bipolar signaling. Such signaling is provided by a bipolar converter 38, connected for receiving serial data output from a substituting device 40 over a data line 42. Bipolar encoded data is provided to a line driver 44, for connection to T/R switch 26 and thereby to the two wire line 14.

In bipolar signaling a logic one consists of a positive or negative pulse, whose width is one half the clock period at the specified data rate. Successive logic one bits alternate in polarity. A logic zero bit consists of a zero signal on the line.

In the present apparatus, circuitry is provided for substituting a particular sequence, or preamble of bits, for predetermined sequences of data bits. Specifically, a sequence of eight zeros is replaced by a preamble of five zero bits, a sixth bit whose value may be zero or one, a seventh bit whose value is zero, and a one bit provided in violation of the bipolar encoding rules described above. That is, a one bit is transmitted whose polarity is the same as the last previously transmitted one bit. Such a bipolar violation is used to indicate that the seven preceding bits form a specific preamble, signifying a particular data bit sequence. As shown in the table below, three types of bipolar violation signaling are provided herein.

TABLE I

|  | MSB |   |   |   |   |   |   | LSB |
|---|---|---|---|---|---|---|---|---|
| Zero Substitution | V | 0 | X | 0 | 0 | 0 | 0 | 0 |
| Ones Substitution | V | 0 | X | 0 | 0 | 0 | 1 | 1 |
| Control Signal | V | 0 | X | $C_4$ | $C_3$ | $C_2$ | $C_1$ | $C_0$ |

The first signal sequence is transmitted with a bipolar violation bit 'V' to indicate that the data contains a string of eight consecutive zeros. The second sequence is transmitted with a bipolar violation to indicate a string of eight ones. The third sequence is used for communicating control signals to the receiver. While theoretically any of 32 control messages may be transmitted by the five bit preamble $C_0$, $C_1$, ..., $C_4$, the first two bits are provided a fixed value, and act as a two-bit preamble to identify a control signal. Preferably, $C_0=1$, $C_1=0$, and any of eight control messages is indicated by bits $C_2$, $C_3$ and $C_4$. It should be understood that where a larger number of control messages must be provided, two bytes may be used. A first byte, including a violation bit, may identify the second byte as a control message of up to eight bits in length.

In the inventive structure, at least one one-bit is transmitted upon the occurrence of a string of seven zero bits in the data stream, in order to permit clock recovery from the receive line. When at least seven logic ones are transmitted, average signal energy is reduced by transmission of the preamble followed by the violation bit as shown above. Finally, for transmission of particular control messages, different preambles are provided, characterized by various bits configurations of bits C2, C3 and C4, as described in the sequel.

The "X" bit transmitted within the preamble is selected to be zero or one, as required, to assure that successive bipolar violation bits alternate in polarity in order to eliminate DC buildup on the line. Thus, if two successive zero substitution signals are transmitted, it is conceivable that, without special provision for alternating the X bit, three successive positive one-bits would be transmitted. Specifically, the last one-bit preceding the first set of seven zeros, the first violation bit, and the second violation bit. By providing the X bit in the preamble, the second zero substitution preamble includes a negative pulse representing the X-bit, and a second negative pulse representing the violation bit, thereby balancing out the DC levels on the line.

The substitution circuitry is specifically shown in FIG. 3 to contain a shift register 46, receiving serial data on line 56 from the SSDA 32. A substitution control circuit 48 receives parallel output data from the shift register, to detect the presence of a consecutive string of eight zeros, ones, or other sequences which it may be desirable to replace. Upon detection of a particular sequence, such as eight ones, for example, a substitution control signal is transmitted by a substitution control circuit 48 on a line 49 to the shift register 46 for accepting parallel input data on lines 50. The data provided on lines 50 represents the preamble to be transmitted in lieu of the sequence for which substitution is desired. Alternatively, where control signals are to be transmitted to a receiving modem, a control signal is provided to substitution circuit 48. In response, circuit 48 generates the substitution control signal for causing shift register 46 to accept a control preamble on lines 50.

The parallel input lines 50 provide the preamble directly to the various cells of shift register 46, for output on lines 52, including the least significant bit output line 54. Output line 54 thus provides a serial data output line for shift register 46, outputting the various data bits as the register is clocked.

The circuitry as described thus provides a serial output on line 54 representing either the serial input on input data line 56 or the information carried by lines 50. Lines 50 are provided with data representing either the zero substitution preamble, the one substitution preamble, or the specific control signal by a multiplexer 58. The input to multiplexer 58 is provided by a generator 60 which generates the one and zero substitution preambles, and by a second set of lines, shown at 62, providing control signals from PIA 34. The data output of shift register 46 on line 54 is also fed back to the input of multiplexer 58 so that the two least significant bits of the zero or one substitution preambles, which are provided to the input of the shift register by multiplexer 58 on line 56, duplicate the data represented in the string of eight consecutive ones or zeros as provided in Table I above. Multiplexer 58 is in turn controlled by a control signal unit 64 which also provides controls for substitution control circuit 48, T/R switch 26, and a substitution inhibiting circuit described in the sequel.

In operation, once substitution control circuit 48 either detects the string of bits to be replaced, or is triggered by control signal unit 64, a signal is transmitted to shift register 46 to accept alternate inputs rather than the serial data output of SSDA 32. Further, a violation generation control circuit 66 is caused by substitution control circuit 48 to generate a violation bit by appropriately disabling bipolar converter 38. The appropriate preamble for the violation bit is provided to shift register 46 by the output of multiplexer 58.

An X bit generator 68 inputs an appropriate bit to shift register 46, in accordance with the condition of a counting circuit and a flip-flop therein responding to the serial output stream on output line 54. A timing unit 70 is provided for controlling timing of the various components of the transmitter and the digital logic control circuitry therefor, as shown in the figure. In a master unit, such as shown at 16 in FIGS. 1A and 1B, timing unit 70 is included in or controlled by host processor 10 or public network 19, respectively. Such a modification of the circuit permits the network or host processor to control synchronized transmission by plural master units. In a slave unit, timing unit 70 is essentially independent of the network, and the unit functions in accordance with the timing of the received signals.

As will be appreciated, while all data transmissions from the various masters in a network are simultaneous, inerleaved responses in the duplex system from the slave units arrive at the master units at varying times, depending upon the distance between the specific master and slave units. The microprocessor control unit of each master is programmed to await the reception of data from its associated slave unit.

The furthest distance between any pair of modems on a particular line is taken into account in a public network situation, so that controllers in the network office are programmed to provide a minimal guard band (time delay), even for the master furthest removed from its associated slave, prior to initiating the next universal transmission by the master units.

In the presently preferred embodiment, fixed length data blocks are transmitted. Preferably, the blocks are four bytes long. Since no byte separation bits are provided, it will be understood that a string of eight 1's or 0's may bridge a pair of bytes. It is also noted that the data output on line 54 by shift register 46 represents the least significant bit of a byte of data appearing on output lines 52. Thus, before data from line 54 is transmitted, the seven following bits for transmission are available on the rest of output lines 52. Substitution control 48 accordingly outputs a substitution control signal on line 49 to begin substitution before the bit stream has been transmitted.

It is another feature of the invention that, while four byte blocks are transmitted in a burst, the fourth byte of a message is not transmitted until the following burst, remaining instead in the shift register 46. Accordingly, if an eight bit 0- or 1-string begins anywhere in the next to last byte, but not in the first, or border, bit thereof, such a string must not be substituted for. If substitution were to take place under such circumstances, the violation bit would not be transmitted, and the transmitted data would be inaccurate. That is, a one or zero preamble must not be shared by separate bursts.

For example, where a four byte message ABCD is to be transmitted, bytes ABC are transmitted during a first burst, byte D being stored for transmission as the first byte of the next burst. The next message, EFGH, is thus transmitted as DEFG.

Examining bytes G and H as in Table II,

TABLE II

|  | X<br>11000000 | V<br>00110011 |
| --- | --- | --- |
| Bit Number | 12345678 | 12345678 |
| Byte | G | H | it is clear that if a zero substitution were permitted for the string of zeros beginning at bit 3 of byte G, the eighth bit of byte G would be replaced by an X bit which may be one, but the H byte, which contains the V bit location at its second bit, would not be transmitted. G would thus be transmitted with an error at location 8.

Accordingly, a next-to-last byte substitution inhibitor is provided, shown as N-1 Byte Substitution Inhibit circuit 72, functioning to inhibit one or zero substitution as soon as three bytes are clocked out of shift register 46 in a four byte burst system. For an N byte burst system, zero and one substitution is inhibited for the (N-1)th byte. The substitution inhibitor circuit includes a counter, and is responsive to control signal unit 64 such that during continuous transmission, as in a test mode for example, inhibition is suppressed.

Referring now to FIG. 4, a detailed circuit diagram is shown for the block diagram in FIG. 3. Each of the enumerated components in FIG. 3 is shown in greater detail in FIG. 4, including the various circuit chips and interconnections thereof.

Referring to the figure, it is seen that a number of address signals are provided on lines 75 by the microprocessor to access the particular transmitter. Thus, a pair of decoders 74 is provided for activating the second SSDA 32 in response to the appropriate address by the microprocessor 28. A byte of data is input on lines 76 to the registers within the SSDA. In operation, upon a reset signal or on power up, all PIA port A lines are provided with a high (+5 V) voltage level. The transmit receive switch 26 is reset to the receive mode on power up, and the third-byte substitution inhibitor 72 is suppressed, or disabled, as are various counters in the receiver. A receive mode latch is set. The receiver is described in the sequel. All other flip-flops, counters, switches, latches, and shift registers are considered to be in a random state after power up.

In operation, the SSDA transmits and receives the least significant bit of each byte first. A transmit bit in a control register C1 of SSDA 32 is reset by the initialization routine executed by microprocessor 28, and the SSDA transmit section is inhibited by a high input level to $\overline{CTS}$. The three bytes for later transmission (bytes A, B, and C) are preloaded into a queue within the SSDA. Finally, the $\overline{PA\emptyset}$ bit drops in response to a control message from the microprocessor. When the PA$\emptyset$ input to AND gate 78 rises, the AND gate is enabled thus enabling the J input of a flip-flop 80 which generates start and stop bits. On the next positive transition of the inverted clock output signal on line 83 output from timing unit 70, flip-flop 80 sets. A delay is provided at 84, on the C input to flip-flop 80, in order to insure that the positive transition of the inverted clock signal on wire 83 arrives at C after the clock signal has dropped at the R input of the flip-flop. The setting of flip-flop 80 sets a latch 86, and feeds a start bit to an OR gate 88.

Latch 86 is used to provide the CTS and $\overline{CTS}$ signals and to control T/R switch 26.

Figure 4A:
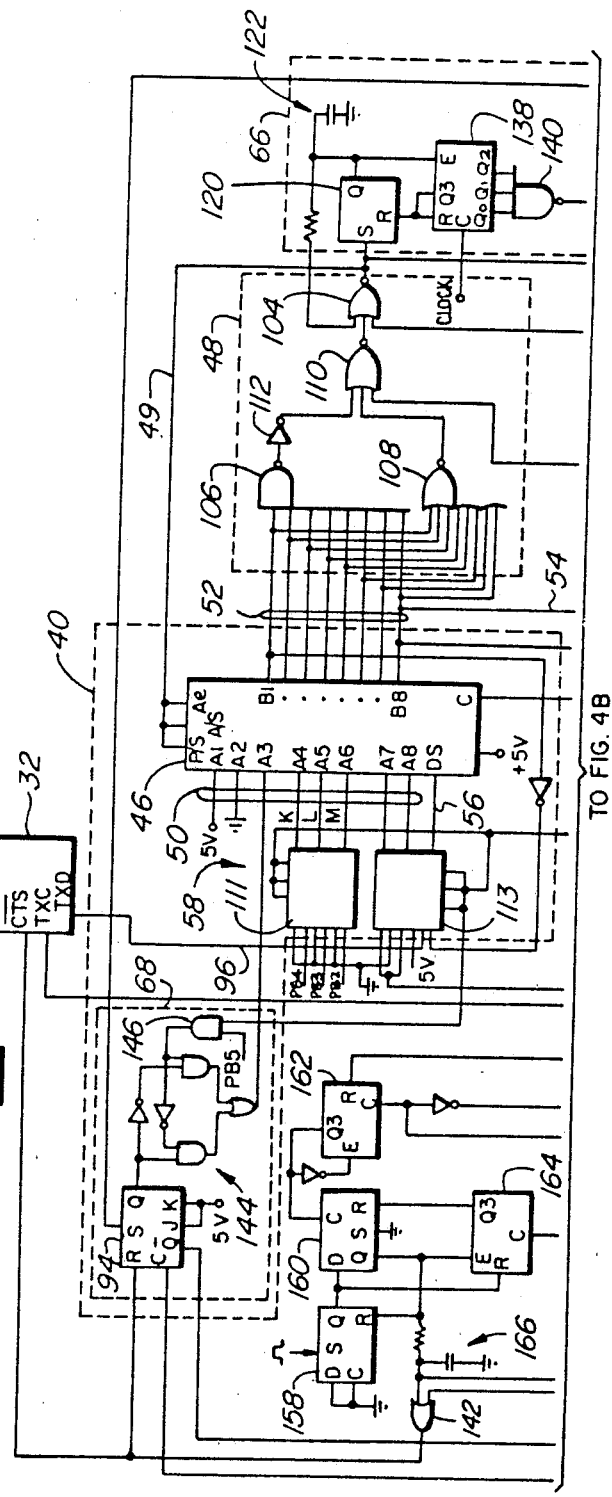
FIG. 4 shows the details of the block diagram of FIG. 3.
Figure 4B:
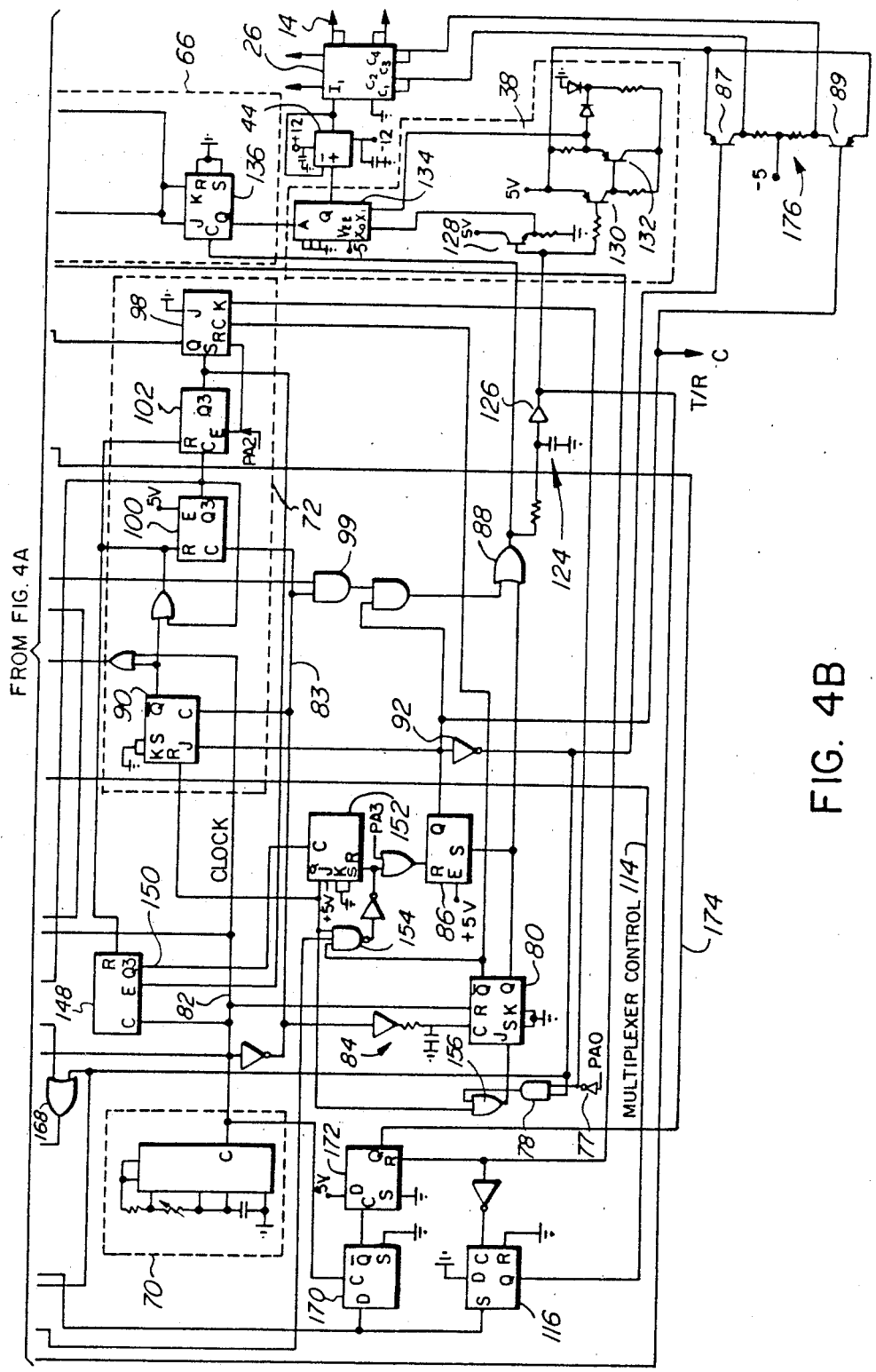

The T/R switch 26, which preferably is a 4066 type chip, responds to ±5 v control signals. Accordingly, a pair of transistors 87 and 89 are used in a level shifting circuit to convert the 0 and +5 v outputs of latch 86 to +5 v and −5 v, respectively. Thus, setting latch 86 provides the appropriate voltages for changing the T/R switch to the transmit mode. Simultaneously, the output of latch 86 enables the J input of a flip-flop 90, and, through an inverter 92 and AND gate 78, disables flip-flop 80 thus terminating the start bit. Additionally, a flip-flop 94 in X-bit generator 68 is enable, and the $\overline{CTS}$ input for SSDA 32 drops, enabling the transmit section of SSDA 32 for transferring the first byte of information to shift register 46 as seen in FIGS. 4A and 4B, when the output of latch 86 is set, the R input to flip-flop 94 is lowered, thus enabling the flip-flop. The first data bit appears on output line 96 from the SSDA upon the occurrence of a negative transition of the first full positive pulse on clock signal line 82 following release of $\overline{CTS}$.

On the next positive transition of the clock signal line 82, flip-flop 80 is reset, thus having formed and finished the start bit. In response to resetting flip-flop 80, the clock input of a flip-flop 98 in the substitution inhibiting circuit 72 is enabled to suppress substitution inhibitions.

It is important that the $\overline{PA\emptyset}$ bit remain at a low level for a time period sufficiently long as to overlap the negative transition of the start bit. At this point, $\overline{PA\emptyset}$ must make a positive transition, and the last byte of the preceeding message is transferred to a three byte transmit first-in-first-out register (FIFO) of SSDA 32. On the next positive transition of the inverted clock line, flip-flop 90 is clocked up and the inverted Q signal thereof transitions negatively, thus allowing shift register 46 to begin receiving clock pulses. Similarly, the first data bit for transmission is formed by ANDing the signal on line 54 with the inverted clock signal of line 83 in AND gate 99, while the first valid data bit appears on line 96 output by SSDA 32.

As the inverted output $\overline{Q}$ of flip-flop 90 drops, a counter 100 is enabled to begin clocking on the next positive transition of the inverted clock signal. Counter 100 is used for driving the substitution inhibit circuit 72.

When the signal on clock line 82 transitions positively, the second data bit is shifted out onto line 54, and the least significant bit of the first byte of the new message is shifted onto input data line 56 for shift register 46.

When the inverted clock signal on line 83 transitions positively, counter 100 begins to count. Regular data clocking now continues for the first three bytes (A, B, C) of the message. A second counter 102 is provided, with an output for setting flip-flop 98 when the next to last byte of a message is being transmitted. As is seen from the diagram, a NOR gate 104 is disabled by the positive output transition of flip-flop 98, thus disabling the substitution control signal provided on line 49.

SUBSTITUTION CONTROL CIRCUIT

During normal operation, however, with gate 104 enabled, it is seen that eight consecutive output bits, whether forming a byte or bridging two bytes, are provided by shift register 46 to NAND gate 106 and NOR gate 108. The output of NAND gate 106 is connected to the input of NOR gate 110 by an inverter 112. As will be appreciated, only if all eight inputs to NAND 106 are of the "one", or high, level will the gate provide a high level input to NOR 110. Similarly, only if all eight inputs to NOR 108 are at the "zero", or low, level will that gate provide a "one" or high level input to NOR 110. Thus, in the event of a consecutive string of eight ones or eight zeros, NOR gate 110 provides a low input to NOR gate 104, combined with a low input from flip-flop 98 except in the next-to-last byte. If the third input to NOR gate 104 is similarly low, the provision of a negative low level input signal by gate 110 provides a high level, or "one" signal on line 49 which is fed back to shift register 46 to trigger a parallel substitution for the output data by data entering register 46 on lines 50. As is apparent from the connections of lines 50, the most significant bit is connected to a positive five volt level, representing a "1" signal. The next most significant bit is grounded, representing a zero input. The third most significant bit is connected to receive the output of X bit generator 68, while the remaining 5 bits receive the outputs of multiplexer 58, which is comprised of a pair of commonly controlled multiplexing chips 111 and 113.

it is noted that the fourth, fifth, and sixth most significant bits receive signals through the multiplexer originating either on lines PB2-PB4 of port B of PIA 34, or as a ground signal. The bits from port B of the PIA represent control bits C2-C4 shown in Table I, supra, generated by the microprocessor in transmitting one of eight possible control messages. The ground level, or zero bits are the three bits of the zero and one substitution immediately preceeding the X bit in Table I. The specific signals to be transferred to the five least significant bits of the preamble are determined by the status of a multiplexer control signal on output line 114 from a latch 116. This signal controls both multiplexing chips 111 and 113, the latter providing the two least significant bits of the preamble. As is seen from FIG. 4, when control meassages are to be transmitted, the two least significant bits are provided with zero and one values corresponding to $C_1$ and $C_0$. For transmission of zero and one substitution preambles it is seen that the inputs to the fourth, fifth and sixth most significant bits are zero while the inputs to the two least significant bits are provided as a feedback from the output data bit, so that the preamble has a pair of ones or a pair of zeros to indicate one or zero substitution as shown in Table I.

Accordingly, when a substitution control signal is provided on line 49, shift register 46 provides eight specific bits for sequential transmission on output data line 54. The register is thus seen to perform one type of multiplexing, in which a selection is made between data bits, provided serially by SSDA 32 on line 96 and entering the register serially on line 56, or a parallel input of the information on lines 50. The data on lines 50 is, in turn, selected by multiplexing inputs either from port B of the PIA or from fixed preamble signals and a pair of data replicating signals.

Circuitry is provided within the violation generation control circuit 66 for disabling further substitution during the time that the eight bits of the substituted byte reside within shift register 46. With reference to the circuit, the control signal output by NOR gate 104 is also used to set a latch 120. The output of that latch, after appropriate delay by a delay circuit 122, is returned to the input of NOR gate 104, thereby disabling any further substitution, once the signals on lines 50 are accepted by the register 46. This arrangement prevents any possibility that the substitution code might itself be substituted for.

BIPOLAR PULSE GENERATOR WITH VIOLATION INJECTION

The data bits provided by OR gate 88 for transmission on lines 14 are delayed by a delay circuit 124, buffered by a buffer element 126 and provided to bioplar converter 38 including a buffer transistor 128 and a pair of inverting transistors 130 and 132. Specifically, the output signal from transistor 132 is opposite in polarity to the output signal of transistor 128. The two bit streams output by transistors 128 and 132 are input to a multiplexer 134, having a control input generated by a flip-flop 136 which is itself clocked by the data stream directly output by OR gate 88. Each 1-bit output by OR gate 88 clocks flip-flop 136 and thus causes multiplexer 134 to alternate the choice of input signal from transistor 128 or 132. Accordingly, consecutive 1-bits are output by multiplexer 134 with opposite polarities, thus providing the bipolar signaling desired in the present embodiment. Inasmuch as the switching of the multiplexer must occur prior to the appearance of the data bits output by transistors 128 or 132, delay circuit 124 assures that the data bits do not appear until substantially after the required polarity switching.

When a signal is being produced which requires a violation bit, latch 120 is set by the output of NOR gate 104 as previously described. The latch output is used to enable a counter 138 to begin counting on the next clock pulse after the one causing the substitution. In the preferred embodiment 8 bit bytes are transmitted. Thus, a NAND gate 140 is used to detect a count of 7 by counter 138. Upon detecting the count of 7, NAND gate 140 provides a low-level output, used to prevent flip-flop 136 from further changing state, thus providing a bipolar violation in the output of multiplexer 134 for the V, or violation bit of the substitution byte. Upon occurrence of the next clock pulse, counter 138 attains a count of eight, thus resetting itself as well as latch 120 in preparation for the next substitution. This mechanism is operative for all substitutions, whether zero and one substitutions controlled by gates 106 and 108 or control signals similarly transmitted with a bipolar violation bit.

The signals output by multiplexer 134, whether including a violation or in proper bipolar code, are provided to a line driver circuit 44 for input to the transmit/receive switch 26.

THIRD BYTE SUBSTITUTION INHIBITOR

As previously described, messages are transmitted in the present embodiment in blocks of four bytes, the last byte of a particular block being held over in register 46 for transmission as the first byte of the next succeeding block. This approach results from a serial transmission of data from SSDA 32 to shift register 46.

Specifically, when a data byte is serially transmitted from SSDA 32 to the shift register, the byte then residing within the register is shifted out of register 46 for transmission. That is, the Kth byte of a fixed length block output by SSDA 32 causes transmission of the K-1st byte from register 46. Thus, after transmission of four bytes of a particular block by SSDA 32, three of the bytes have been transmitted by register 46 through line driver 44, and the fourth remains within the register for transmission as the first byte of the succeeding block. Accordingly, as soon as the last byte of a block begins to be transmitted from SSDA 32 to register 46, one or zero substitution must be disabled since the gating circuitry comprised of NAND gate 106 and NOR gate 108 detects any eight consecutive ones or zeros, including a consecutive string bridging the last two bytes of a block transmitted by SSDA 32. Since the next to last byte of a block output by SSDA 32 is, in reality, the last byte of the block to be output by register 46, any such string of consecutive ones or zeros overlaps two separately transmitted data blocks. Such an overlap leads to an error in transmission as shown above. Accordingly, counters 100 and 102 and flip-flop 98 form the substitution inhibiting circuit 72 for disabling substitution after 24 bits have been plucked out of register 46.

X-BIT GENERATOR

In order to provide complete DC cancellation of the effects of transmission of positive or negative one bits, from the start bit through to the violation bit, an X-bit is generated in the violation preamble. As previously described, the X-bit will be either a zero or a one, appropriately selected to maintain DC balance on lines.

The X-bit itself is determined at the time a substitution, or control signal is required. The determination occurs prior to the transmission of the least significant bit at Table I, supra. More specifically, the value of the X-bit is determined prior to transmission of the first five bits of the preamble. Since an even number of ones includes as many positive bits as negative bits, no DC buildup is effected thereby. Accordingly, the number of one-bits in the first five bits of the preamble must be even, in order not to disturb the DC cancellation provided by the already determined X-bit. For this reason, both preambles for zero and one substitution include an even number of ones. Specifically, the zero substitution includes no ones while the one substitution preamble includes two ones.

The functioning of the X-bit generator 68 is more clearly understood with reference to the circuit diagram in FIG. 4. As is seen there, flip-flop 94, which is reset by the pulse output of an OR gate 142 enabling and disabling the transmission cycle of SSDA 32, is released at the start of a transmission block. Flip-flop 94 is connected to be clocked by the data stream output by buffer element 126. With its J and K inputs connected to logic one, flip-flop 94 is thus clocked up by the start bit and by each subsequent one-bit during that transmission block. Accordingly, the present circuit causes the output of flip-flop 94 to be at the "one", or high level only for previous transmission of an even number of one bits in a particular transmission block. It is precisely under such circumstances that the X-bit of the preamble must itself be a one. The output of flip-flop 94 is accordingly input to the third most significant bit of shift register 46 on lines 50 to provide the X-bit of a preamble transmitted thereby.

For transmission of control signal preambles, however, there is no guarantee that the number of one-bits in the five least significant bits of the preamble is indeed even, as required to maintain the validity of the X-bit. Particularly, as previously described with respect to Table I, the C0 and C1 bits are predetermined to be one and zero, respectively. The C2, C3 and C4 bits, representing any of eight possible control messages, must thus have an odd number of 1-bits in order to retain the validity of the X-bit. If all eight possible control messages are to be transmitted, however, it is seen that only four permutations of the bits C2, C3 and C4 have an odd number of 1-bits. For control messages in which either none or two of the control bits C2, C3 and C4 are ones, the X-bit itself must be inverted prior to being provided to the input of shift register 46.

Towards that end, an exclusive OR circuit is provided at 144. The inputs of the exclusive OR circuits are provided by the output of flip-flop 94, on the one hand, and the output of an AND gate 146, on the other. AND gate 146 receives as its inputs a control signal PB5, from port B of the PIA 34, and the multiplex control signal provided on line 114. The signal on PB5 is provided by microprocessor 28 in accordance with a determination of the values of control bits C2, C3 and C4. In the preferred embodiment, in which the multiplexer control signal on line 114 is at a high level, multiplexer 58 transmits the control bits provided by lines PB2, PB3 and PB4 from port B of PIA 34 to the shift register. Under those circumstances, a software operation is used by microprocessor 28 to determine whether the number of 1-bits on lines PB2, PB3 and PB4 is odd. If the number is odd, PB5 is left at a low level. If the number is even, however, the signal at PB5 is provided with a high level. The PB5 line is thus at a high level when the total number of 1-bits in the 5 bit preamble C0, C1, C2, C3, C4, is odd.

The output of AND gate 146 is thus provided with a high level only under conditions where a control signal is to be transmitted to the shift register and the control signal violates the requirement for an even number of one bits in the five bits preceeding the X-bit. As is known in the art, a one input on one of two lines entering an exclusive OR leads to an output which is the complement of the second entering line. Thus, under the above-identified circumstances in which AND gate 146 provides a one output, the signal provided to shift register 46 is the complement of the output of flip-flop 94. Under any other circumstance, the output of AND gate 146 is a zero level, and accordingly the output of exclusive OR circuit 144 the same as that of flip-flop 94. For transmission of either a bit string substitution, or for transmission of control signals having an even number of 1-bits in the least significant five bits of the preamble, the output of flip-flop 94 is provided by the circuitry of FIG. 4 as the correct X-bit for the preamble. For situations where a control signal includes an odd number of 1-bits in the preamble, an inverted form of the output of flip-flop 94 provides the correct X-bit. The X-bit generator 68 thus assures the desired DC cancellation.

Upon each occurrence of a violation bit, as indicated by the occurrence of a "one" level or high pulse signal at the output of NAND gate 140, the X-bit flip-flop 94 is set to one, indicating an even number of previous 1-bits in the block, thereby to start counting anew with the occurrence of further 1-bits in the remainder of the transmission block.

The present X-bit generator thus provides a DC cancellation bit assuring that an even number of bits are transmitted right up through the transmission of a violation bit. Moreover, the X-bit generator assures that violation bits transmitted in the same block have opposite polarities.

STOP BIT GENERATOR-END OF BLOCK DC BALANCE

Upon termination of a tranmission of a block, a signal is required to be generated and transmitted to microprocessor 28, as well as to switch the SSDA 32 to a receive mode. In the present embodiment, a counter 148 is provided to supply a signal indicative of the end of a transmission block. The counter 148 is reset by the signal provided for resetting counter 102, and is enabled by the output of that counter 102. In essence, counter 148 overrides clocking of the register 46 once the fourth byte of the transmission block is established therein. Counter 148 is used to reset the transmitting section as well as to generate a stop bit to provide DC cancellation at the end of a block.

Counter 148, which is enabled by the output of counter 102 and clocked by the clock signal on line 82 by timing unit 70, is used to provide an output signal on line 150 as soon as four full bytes have been processed. Specifically, the output signal is generated upon determining that the fourth byte output by SSDA 32 is established in register 46. The output signal of counter 148 is used to clock a flip-flop 152, in turn resetting flip-flop 90, thereby to stop supplying a clock signal to shift register 46 and to disable the register from accepting further data from SSDA 32 or from further data shifting to the transmission lines.

At this time, flip-flop 94 is used to determine whether a DC balance bit must be generated at the end of the transmitted block in order to provide an average DC voltage level of zero for the block.

If the flip-flop 94 is set, its $\bar{Q}$ output signal is low, indicating the requirement for an additional balance bit. A NAND gate 154 is disabled by this low signal. However, flip-flop 152, which was set by the output of counter 148, in turn sets flip-flop 80 through an OR gate 156. Flip-flop 80, which is the start and stop bit generator, thus generates an additional bit upon occurrence of the next clock pulse, at the end of the transmission block. The additional bit, the "stop bit", is passed through OR gate 88 after the 32nd data bit for transmission onto lines 14 and for balancing the DC level thereon. After a delay by delay circuit 124, the stop bit clocks flip-flop 94, raising its $\bar{Q}$ output to NAND gate 154. The $\bar{Q}$ output of flip-flop 80 passes through NAND gate 154 to reset flip-flop 152 as well as latch 86, thus finally terminating the block and switching latch 86 to the receive mode.

If flip-flop 94 is in its reset state, however, no balance bit is required. In this situation, it is seen that all inputs to NAND gate 154 are high, thus resetting flip-flop 152 and latch 86, thus switching to the receive mode without generation of the additional balancing bit.

It should be understood that the end of a transmission block may be detected by software. Specifically, a TUF signal, indicating that the three byte FIFO is empty, is generated by SSDA 32. In a private line, microprocessor 28 may poll the associated SSDA to determine the completion of the various transmissions. In a network environment, a central computer in the network office may poll the various SSDA units for the same purpose. The above described circuit, however, eliminates the need for polling the status registers of the several SSDA units, and avoids an attempt to disable the SSDA by depending on a signal which was internally generated by itself.

CONTROL SIGNAL GENERATION

A control pulse is provided in order to generate an interrupt signal to enable loading of the control bits C2, C3 and C4 into shift register 46. The control pulse is provided by PIA 34 on its A port, on line A1, although it is equally possible to provide such a signal on other lines thereof.

The control pulse is generated by microprocessor 28 using a software routine, and provided to a set terminal for a flip-flop 158. Flip-flop 158 which acts as a latch for storing the control pulse, is left undisturbed until the control word has been loaded into the shift register. At the beginning of the shiftout sequence for shift register 46, flip-flop 158 is reset by the output of a flip-flop 160. The same signal is also used, after a delay, to disable SSDA 32.

Flip-flop 160 is connected to be clocked by the output of a counter 162, in turn clocked by the internal clock line, and to be reset by the output of a further counter 164. Flip-flop 160 is used to time the period of the shift register in order to permit the bits stored therein to be transmitted. The timing of this period is achieved by using the output of counter 162 to clock flip-flop 160.

Counter 162 specifically provides timing for disabling SSDA 32. This counter is reset by the output of counter 100, which generates a pulse every eight data bits. Counter 164 is used in conjunction with flip-flop 160 to provide the duration for the SSDA disabling pulse. A 7.5 bit duration is required for the specific circuit components utilized in the presently preferred embodiment. Counter 164 is clocked by the output of an OR gate 168, having as one input a component of the $\overline{CTS}$ signal and as the other input the inverted clock signal. To assure that the shift register fetches the last output bit from SSDA 32 prior to disabling of the SSDA by the $\overline{CTS}$ signal, a delay circuit 166 delays the application of the disabling pulse to SSDA 32.

A pair of flip-flops 170 and 172 provide a control signal on a line 174 to shift register 46 to enable loading of the control word. The loading pulse is provided if and only if the shift register's data has been emptied out. As is seen in the circuit diagram, the disabling pulse for SSDA 32 is delayed by circuit 166. This delay is provided to assure that the shift register fetches the last output bit from SSDA 32 before the SSDA is disabled by the $\overline{\text{CTS}}$ signal. The delayed pulse is provided by delay circuit 166 to the set and data terminals of flip-flops 116 and 170, respectively. The output of flip-flop 170 is used to clock flip-flop 172 at the end of the $\overline{\text{CTS}}$ signal. Flip-flop 172 holds the control signal, intended for loading the shift register, until completion of the loading step. The output of flip-flop 172 is provided on output line 174 as the third input to NOR gate 110. As will be recalled from the previous description of the substitution control circuit, when any input to NOR gate 110 is high, assuming appropriate output signals from flip-flops 98 and 120, a control signal is generated on line 49 to load the contents of lines 50 into shift register 46.

LINE RECEIVER AND CONDITIONER

Figure 5:
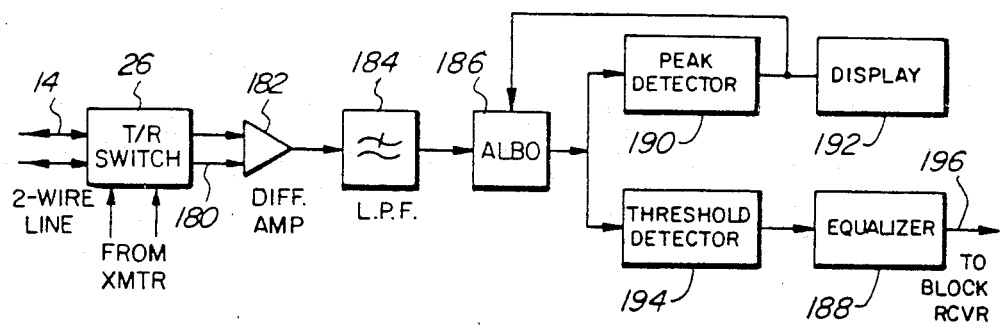
FIG. 5 shows a block diagram of a line receiver and conditioner portion of the receiver block of FIG. 2.

Referring now to FIG. 5, the line receiver and signal conditioner logic is shown. The figure also shows the T/R switch 26 as connected to the two wire line 14, and to the transmitter of FIG. 4. In response to the signals generated by latch 86 in true and inverted form, shifted by a pair of transistors 87 and 89 connected in the form of a level shifting circuit 176, all shown in FIG. 4, the T/R switch is controlled to be either in the transmit or receive mode. In the receive mode signals obtained from line 14 are provided along lines 180 to a differential amplifier 182, utilized in the circuit to allow for interchanging the connections of the wires of lines 180. Thus, by using the differential amplifier, no polarity precautions need be observed for connection of the wires of line 180.

A low pass filter 184 filters out high frequency noise, and an automatic line build out circuit (ALBO) 186 provides signal equalization as is known in the art by processing the signal so that every cable pair appears as a maximum length pair to an equalizer 188. The ALBO thus compensates for differences among signals transmitted over different distances.

A peak detecting circuit 190 is provided for determination of loss of line signal, and an LED display 192, connected to receive an indication from the peak detecting circuit 190, provides a display of such signal loss. In the event of data errors due to loss of signal amplitude, the output of the peak detecting circuit 190 is used to signal the microprocessor, which is programmed to respond by causing retransmission of the improperly received signal block. The peak detecting circuit provides one form of error detection. As is known in the art other types of error detection circuits are available. Circuits for detecting parity errors or other coding errors may also be used in the present invention. Similarly, error correction circuits may be used for correcting such coding errors. Particularly, the microprocessor itself may be programmed to respond to an indication of a received error by correcting the error in accordance with a particular coding scheme.

Figure 6:
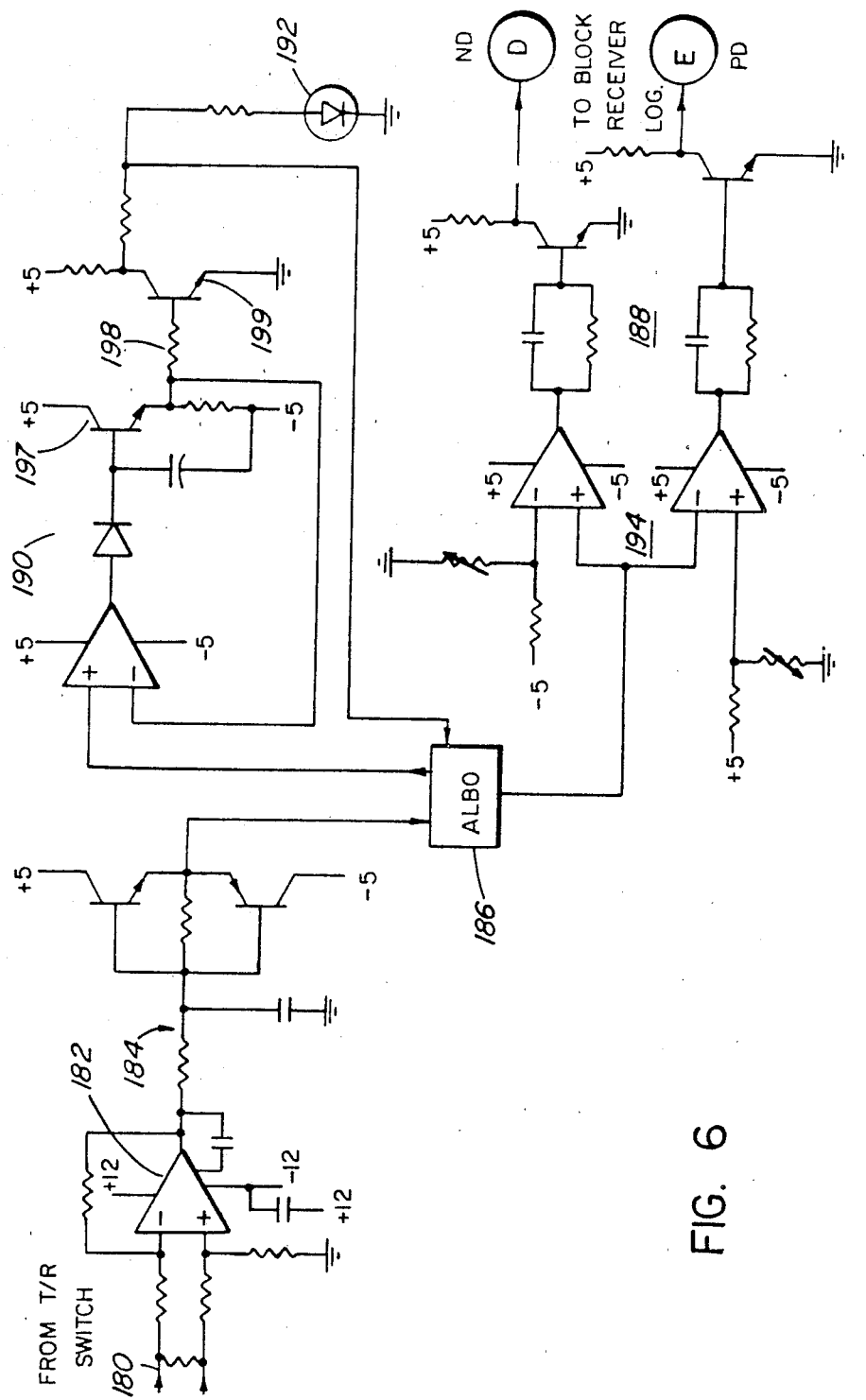
FIG. 6 shows the details of the block diagram of FIG. 5.

A threshold detector 194 is used to eliminate noise signals below a predetermined threshold. This circuit is adjustable, in order to permit operation in varying noise environments. A specific circuit configuration realizing the line receiver of FIG. 5 is shown in FIG. 6. In FIG. 6, differential amplifier 182 is shown to be comprised of a type LM 318 operational amplifier, connected for operation as a differential amplifier. A further pair of LM 318 amplifiers is connected to provide positive and negative threshold detectors 194. A type 741 amplifier is connected in peak detecting circuit 190, with a transistor 197 connected in an emitter follower configuration to provide at its emitter a peak output signal. A resistor 198 is selected to bias a transistor 199 to the on state, thus disabling LED 192, for acceptable peak signal levels. For lower signal levels, transistor 199 remains off and LED 192 is illuminated. The collector output of transistor 199 is fed back to ALBO 186.

As is apparent from FIG. 6, equalizer 188 provides a pair of output lines, shown at ND and PD. Thus, the line receiver and conditioning circuit of FIGS. 5 and 6 provides positive unipolar pulses on line PD, and negative unipolar pulses on line ND.

BLOCK RECEIVER LOGIC

Figure 7:
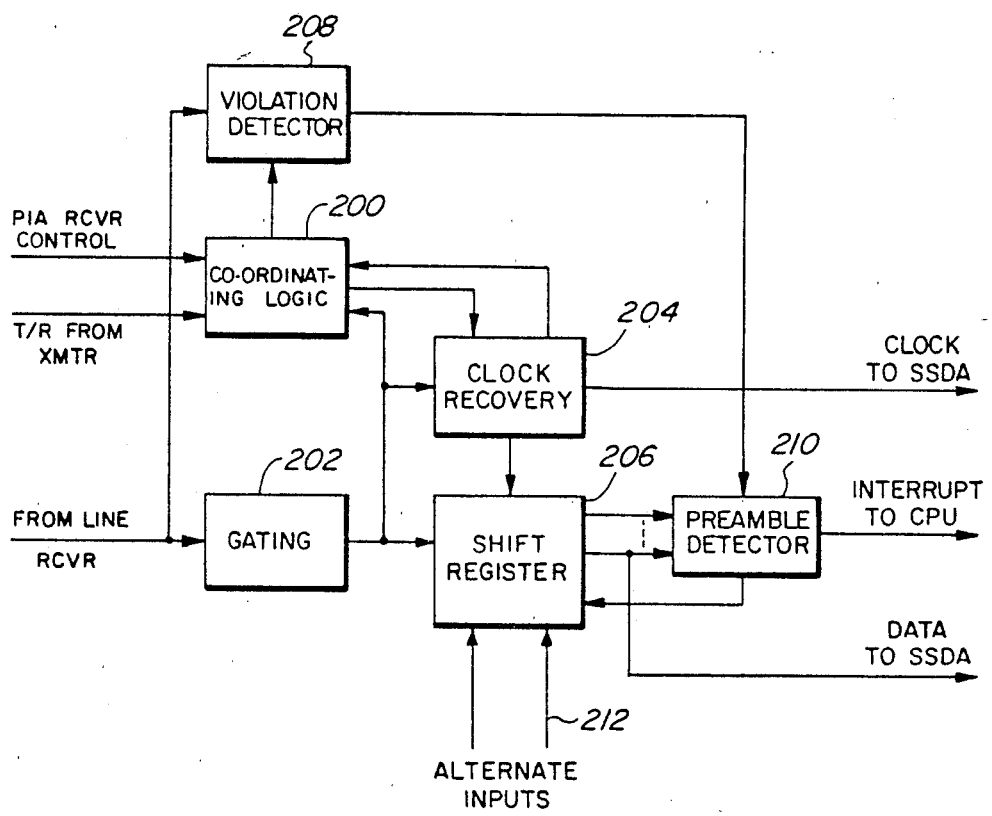
FIG. 7 shows a block diagram of a second portion of the receiver block of FIG. 2.

The output signals from the circuit of FIG. 5, symbolically shown on a single output line 196, are input to the block receiver and violation bit detecting circuitry of FIG. 7.

A coordinating logic circuit 200 receives and is initialized by the transmit/receive control signal, output by latch 86 in FIG. 4. Gating logic 202 is provided to control the flow of the incoming signals to a clock recovery circuit 204, to a shift register 206, as well as to cordinating logic 200. Simultaneously, the signals from the line receiver are provided to a violation detecting circuit 208. In addition to initialization of the coordinating logic circuit 200 by the transmit/receive signal from the transmitter logic circuits, a number of receiver control signals from the microprocessor are provided to logic 200 by way of the PIA.

In operation, the clock recovery circuit 204 causes the data from the input line to be appropriately received by and shifted out of shift register 206 to the SSDA. Upon detection of a bipolar violation by violation detecting circuit 208, a preamble detector 210 is activated to determine the specific preamble associated with the violation. Upon detecting a zero or a one preamble indicative of a zero or one substitution, preamble detector 210 causes shift register 206 to substitute alternate data, from lines 212, for the preamble, and to inject the alternate data into the data stream to the SSDA. However, upon detecting a control signal preamble, preamble detector 210 generates an interrupt request for the microprocessor and the control signals are provided, without substitution, from shift register 206 to the SSDA for communication with the microprocessor. The recovered clock signal is also provided to the SSDA for synchronization of the data stream.

Figure 8:
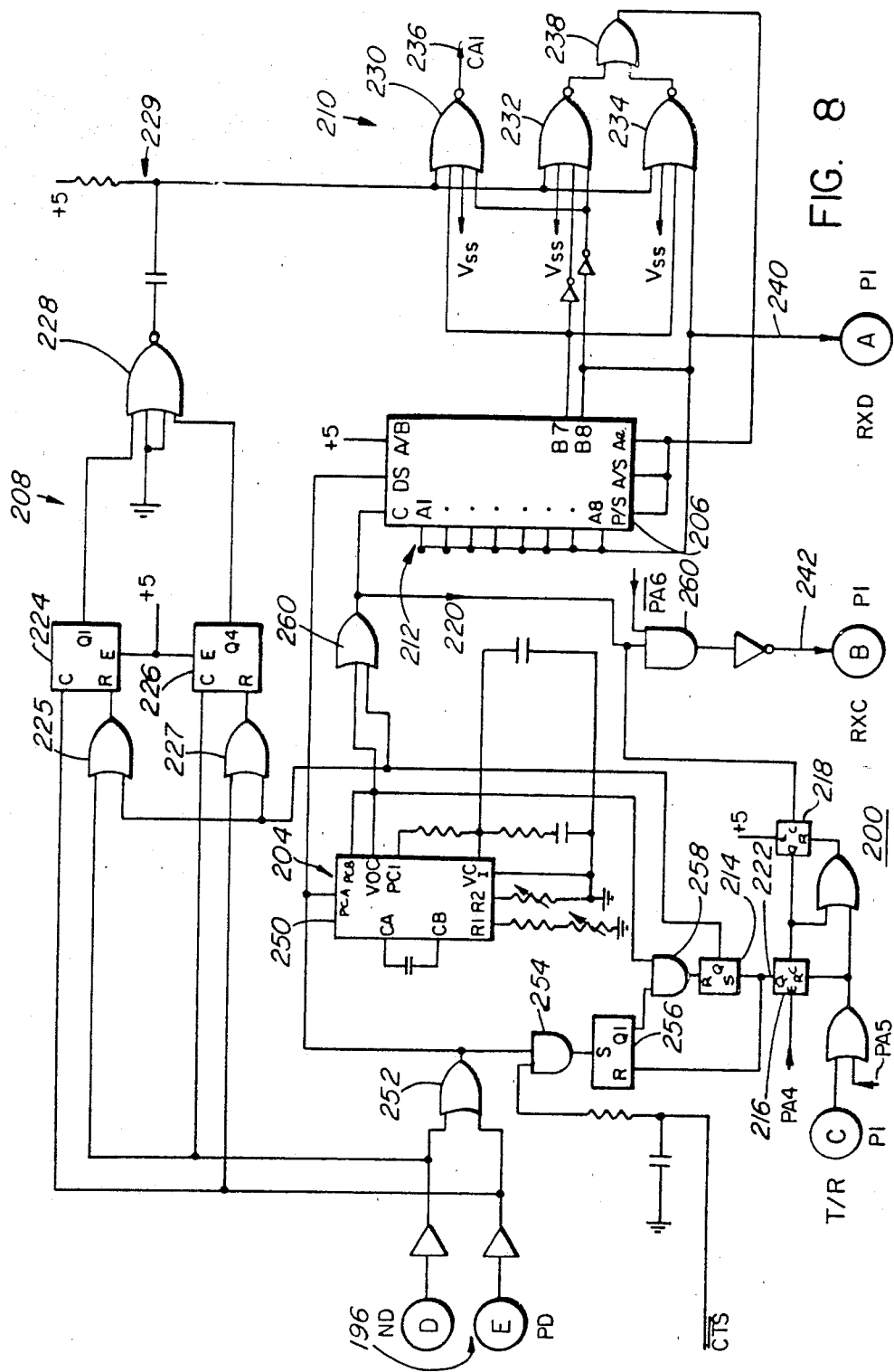
FIG. 8 shows the details of the block diagram of FIG. 7.

Referring now to FIG. 8, specific circuit components are shown for the diagram of FIG. 7.

A latch 214 is reset to enable the violation detector 208 and shift register 206 to begin clocking. A pair of counters 216 and 218 are reset by the transmit/receive control signal generated by latch 86 in the transmitter control logic of FIG. 4. Alternatively, a control signal provided on line PA5, from PIA 34, also resets counters 216 and 218. These counters keep track of the number of bits received in the transmission block. Specifically, counter 218 is clocked by the recovered clock pulses output by clock recovery circuit 204 on line 220. Upon reaching a predetermined count (8 for an 8 bit byte, for example), the counter is reset by a feedback connection. The output signal of counter 218, representing received bytes, is used to clock counter 216. The output of counter 216 represents a count of the number of bytes received in the block. Line 222, which is connected in counter 16 to provide an output upon reaching a count of N terminates the block receive function after reception of N such bytes. In the preferred embodiment, N=4. Such termination is achieved by connecting the output signal from counter 216 to set latch 214, thereby to terminate the clocking functions of shift register 206 and violation detecting circuit 208. For continuous operation in the receive mode, as may be required during testing of the data set, microprocessor 28 causes PIA 34 to output a high level signal on its PA4 line. As long as PA4 is high, counter 216 is effectively disabled, so that latch 214 remains in the reset state and a latch 256, described infra, is not reset, irrespective of the number of received bytes.

VIOLATION DETECTING CIRCUIT AND PREAMBLE DETECTOR

During the receive operation, the components of the circuitry in FIG. 8 operate as follows. A pair of counters 224 and 226 in violation detecting circuit 208 receive the unipolar sequences of positive and negative pulses from the output terminals PD and ND of FIG. 6, respectively. Counter 224 is clocked by the positive pulses and reset by the negative pulses, while counter 226 is clocked by the negative pulses and reset by the positive pulses. Both counters are also reset by the output of latch 214 provided on OR gates 225 and 227. Neither counter can reach a count of 2 unless two consecutive pulses of the same polarity are detected without an intervening pulse of the opposite polarity. That is, neither counter reaches a count of 2 unless a violation is detected. Accordingly, the "count two" outputs of counters 224 and 226 are provided to a NOR gate 228. NOR gate 228 enables NOR gates 230, 232, and 234 in preamble detector 210.

An RC waveshaping circuit 229 is provided on the output of NOR gate 228 in order to limit the width of its output substitution enabling pulse.

Each of the identified NOR gates in detector 210 receives the two least significant bits in shift register 206 and compares them with the particular values expected in the three types of preambles.

Particularly, NOR gates 232 and 234 check for a pair of ones or zeros in the least significant bits of the byte to indicate a one or zero substitution in conjunction with the detected violation bit in the most significant bits of the byte. NOR gate 230 checks for a configuration of 1-0 for control bits C0 and C1 to determine whether a control message is received when a violation bit is detected. The output of NOR gate 230 is used to generate an interrupt for the microprocessor on line 236. If either NOR gate 232 or 234 matches the zero or one substitution preamble with the detection of a violation bit, a signal is provided at the output of an OR gate 238, connected to shift register 206 for substitution of the data on input lines 212 into the register cells. The data on lines 212 is obtained from the least significant bit of the byte within the shift register, thus assuring that the appropriate bit stream is substituted for the detected preamble in the event a violation bit is sensed. In the event of a control signal interrupt, software within the microprocessor is used for controlling reception of the control signal. Whether or not a substitution has been made, the shift register output is provided on line 240 to the SSDA 32. Similarly, the recovered clock signal on line 220 is provided to the SSDA at line 242.

The coordinating logic also receives control signals PA4 and $\overline{PA6}$ from port A of the PIA. A signal on PA4 is used to disable counter 216, thus to maintain latch 214 constantly in a reset state. The PA4 signal thus provides for a continuous reception mode of operation of the inventive structure. This feature may be used in testing the structure, for example, without the necessity of alternating transmission periods between reception periods.

CLOCK RECOVERY

Clock recovery circuit 204 is provided for detecting and recovering clock signals. As seen in FIG. 8, a phase lock loop (PLL) 250 is provided with signals detected by an OR gate 252 from the lines ND and PD. The PLL may be a type 4046 chip. As is apparent from the circuitry of FIG. 6, unipolar pulses of the same polarity are provided on the ND and PD lines to represent negative and positive pulses, respectively. These pulses, appropriately phased, are provided to OR gate 252, which outputs a single, recreated, unipolar data stream which is fed into the PLL 250 and to the data terminal of shift register 206. The phase lock loop provides clock recovery, but with a 90° phase lag with respect to the incoming data. The recovered clock stream thus lags the start bit of a transmission block by one half a bit pulse duration.

When the inventive data set is in the receive mode the $\overline{CTS}$ signal is high as previously described. An AND gate 254 is enabled thereby to pass the recreated unipolar data stream output of OR gate 252. A latch 256 is set by the output of AND gate 254.

Throughout the receive portion of the cycle, that is, before the full four bytes of the transmission block have been counted by counter 216, latch 256 remains set, thus enabling an AND gate 258. Because of the 90° phase lag of the clock signal output by phase lock loop 250, latch 214 is not reset until midway through the start bit. Thus, the Q output of latch 214, which drops at that time, enables counters 224 and 226, by way of OR gates 225 and 227, to count as of the next succeeding clock pulse. That is, the start bit is ignored in the violation detector. Similarly, an OR gate 260 which receives the recovered clock signal from the phase lock loop 250, does not provide the clock pulses to shift register 206 until after dropping of the output of latch 214. Thus the shift register is not clocked until termination of the start bit. Accordingly, the start bit will not be accepted by the shift register. The clock recovery circuit thus strips the start bit from consideration by the block receiving circuit.

The pulses output by OR gate 260 are counted by counters 218 and 216. The 32nd such pulse, occurring midway through the 32nd data bit, resets latch 256 and sets latch 214, thereby disabling AND gate 258 and OR gates 225, 227, and 260. Since no further clock pulses are passed by OR gates 260, shift register 206 will not store the stop or DC balance bit. Additionally, reset latch 256 disables AND gate 258 from further resetting latch 214. Moreover, during the succeeding transmission cycle, the $\overline{CTS}$ signal drops to enable the SSDA 32, thus disabling AND gate 254. The transmit/receive control signal output by latch 86 in FIG. 4 further resets counters 216 and 218, in preparation for the next data receive cycle.

During the receiver cycle, a control signal $\overline{PA6}$, entering an AND gate 260, controls injection of clock pulses on line 220 to the SSDA. These pulses are used to sample the data on line 240, similarly provided to the SSDA.

CONTROL PROGRAM

Microprocessor 28 is programmed to communicate with the previously described receiver and transmitter circuitry through PIA 34. The PIA in turn communicates with the various circuit components using two ports, port A and port B, provided therein. The signals on specific lines on port A are identified as PA0, PA1 . . . PA7, and the signals on the lines of port B are identified as PB0, . . . PB7. Additional communication lines with the PIA include an input line CA1 as well as other lines of lesser significance to the present invention.

The connections provided in the diagrams of FIGS. 4 and 8 show several of the communication lines from the PIA as providing specific signals. The functions of the individual signals are listed in the following table:

TABLE III

| | |
|---|---|
| $\overline{PA0}$ | initiate transmission of block |
| PA1 | control interrupt for loading C2, C3 and C4 in MUX 58 |
| PA2 | disable N-1 byte substitution inhibitor (used only in continuous transmit program) |
| PA3 | reset T/R switch to receive |
| PA4 | disable receive counters (used only in continuous receive program) |
| PA5 | reset receive counters |
| $\overline{PA6}$ | inject SSDA receive pulse |
| CA1 | control preamble detected |
| PB2 | control bit C2 |
| PB3 | control bit C3 |
| PB4 | control bit C4 |

Microprocessor 28 further communicates with the SSDA units by means of address and data signals, addressing the SSDA as two addressable memory locations. Additionally, the microprocessor receives information from the logic circuitry of FIGS. 4, 6 and 8 pertaining to the status of various counters and the like.

The programs controlling interaction between the microprocessor and the various circuit components are described in the flow charts of FIGS. 9 through 13, for example.

Figure 9:
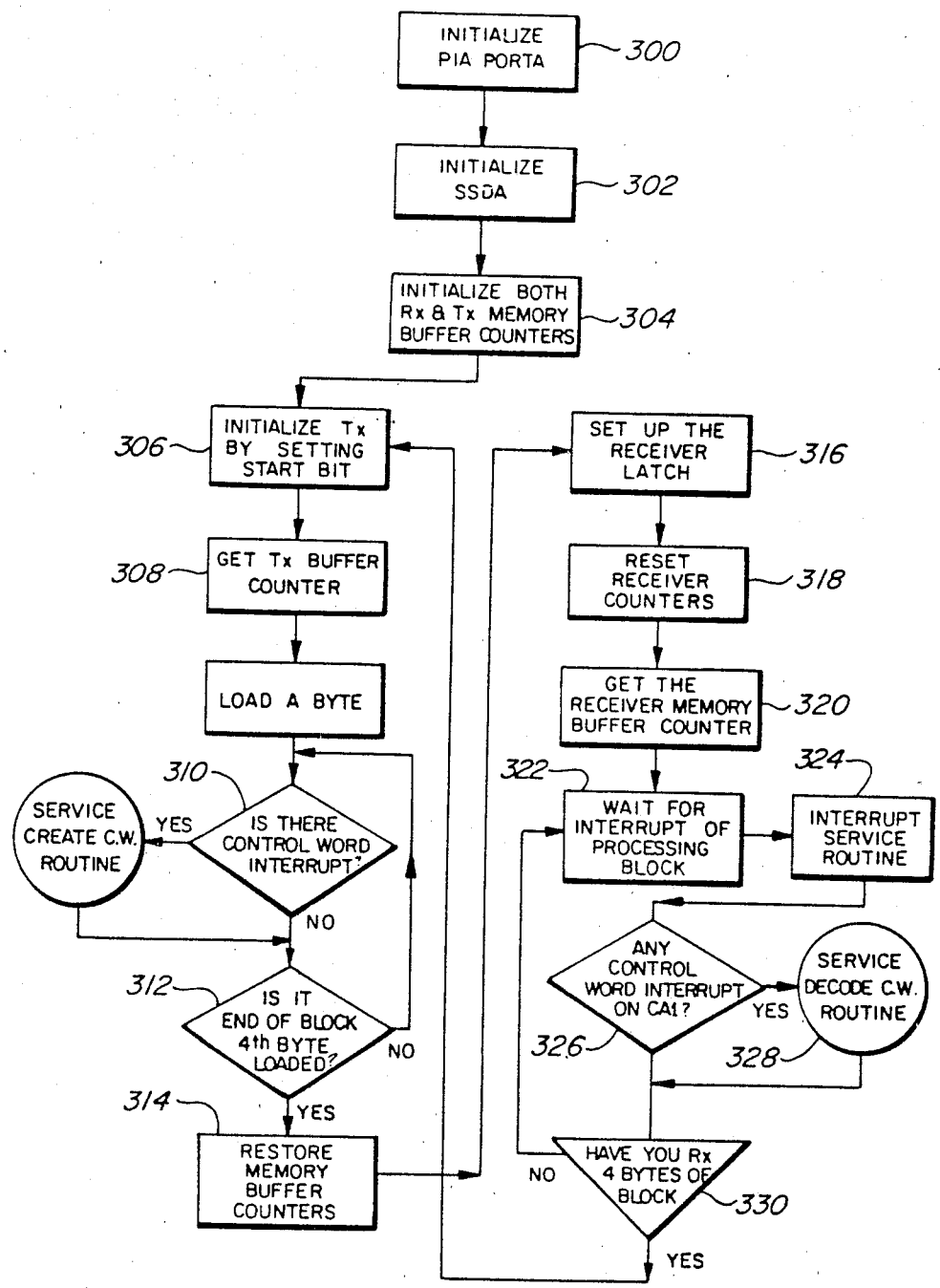
FIGS. 9–13 show flow charts of various programs and subroutines used in controlling the microprocessor of FIG. 2.

Referring now to FIG. 9, the flow chart for full duplex operation starts with a step 300 for initialization of port A of PIA 34. The microprocessor assures that extraneous signals are not present and that the various terminals of port A are provided with the required initial signals, such as a high signal at $\overline{PA0}$.

The SSDA 32 is initialized by the microprocessor in step 302, while a pair of memory buffer counters in both the receive and transmit sections of the SSDA are initialized in step 304.

The transmit section of the SSDA is initialized by setting a start bit in step 306, while the contents of the memory buffer counter for the transmitting section of the SSDA are provided to the microprocessor at step 308. At that time, determination of the existance of a control word interrupt causes the microprocessor to exit to the Create Control Word subroutine at step 310. After creating the appropriate control word, the subroutine returns to step 312. Lacking such a control word interrupt, a determination is made at step 312 as to whether the fourth byte of the data block has been loaded by the SSDA. Until such confirmation, the microprocessor cycles in the loop of steps 310 and 312. Once the loading is confirmed, the memory buffer counters are restored at step 314, and the receiver latch set at step 316. In this step, latch 214 is appropriately conditioned to begin the receive portion of the transmission cycle.

The receiver counters 216 and 218 are reset at step 318 by transmission of a signal on line PA5. The contents of the memory buffer counter of the receiver section of SSDA 32 are obtained and read at step 320, and the microprocessor enters a loop at step 322, waiting for an interrupt to continue further. Upon receiving such an interrupt, an interrupt service routine is executed at 324, and a determination is made at step 326 whether a control word interrupt has been raised by the block receiver on line CA1. If a violation bit is detected by violation detecting circuit 208 and a control preamble detected by NOR gate 230, the interrupt signal is found at CA1 and a decoding subroutine for the control word is executed at 328, to identify the action to be taken.

If a control word interrupt on line CA1 is not found at step 326, the SSDA receiver counter is interrogated at step 330 to determine whether four bytes of the data block have been received. If the number of received blocks is less than four, step 322 is again executed. That is, the microprocessor continues to wait for an SSDA interrupt indicating byte completion. Once it is determined in step 330 that four bytes of data have been received in the block, the program returns to execution of step 306 once again to start the transmission portion of the SSDA communication cycle.

Figure 10:
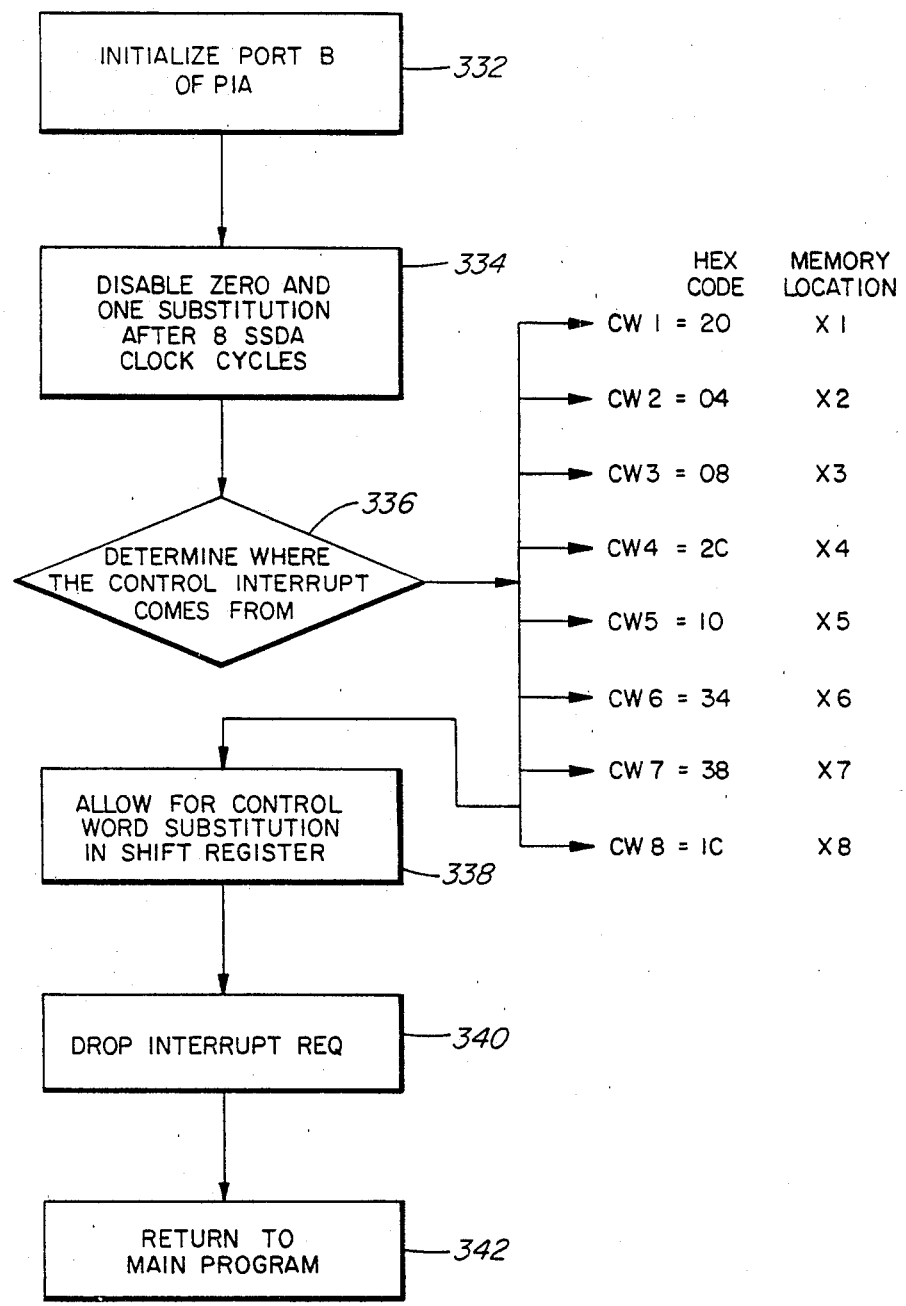

Referring now to FIG. 10, a flow chart is provided for the Create Control Word subroutine entered upon a positive determination at step 310 of the flow chart of FIG. 9. The terminals of port B of the SSDA are initialized at step 332, and the zero and one substitution disabled after eight clock cycles of the SSDA at step 334. The latter step is essentially carried out by the hardware configuration previously described with respect to FIG. 4.

Upon determination by the microprocessor of the origin of the control word interrupt, seen at step 336 to relate to the location in which the interrupt signal is stored, the control preamble is caused by the microprocessor to be provided on lines PB2, PB3 and PB4 at step 338. This step functions in conjunction with the operation of the circuitry described at FIG. 4 to load the control message preamble into shift register 46. Finally, at step 340, the interrupt request is dropped and the subroutine returns control to the main program at step 342.

Figure 11:
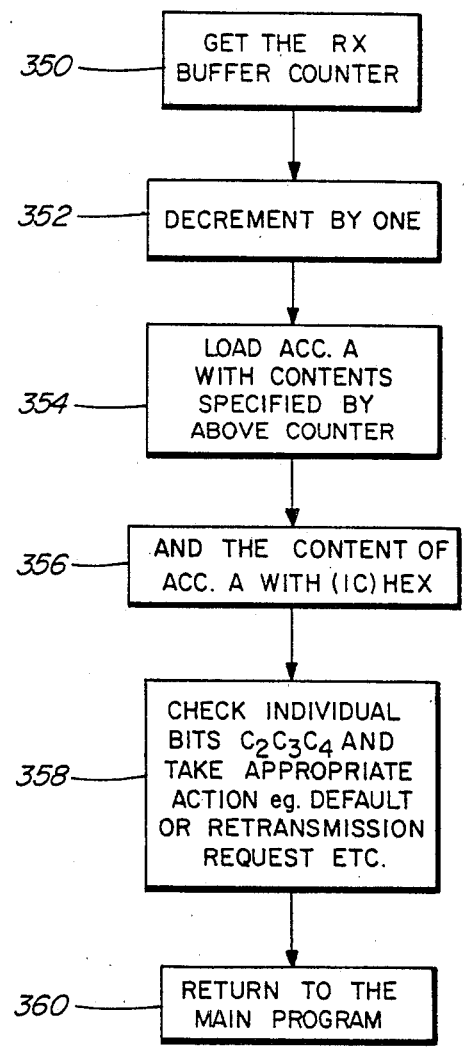

Referring now to FIG. 11, the subroutine executed at step 328 in FIG. 9 for decoding the control word is seen to start at step 350, where the contents of the receive memory buffer counter is provided to the microprocessor. The contents of the counter are decremented by one at step 352, and an accumulator A, within the SSDA, is loaded with the contents of the location specified by the buffer counter at step 354. The contents of accumulator A are ANDed with "1C" in hexadecimal code at step 356, in order to provide the individual C2, C3, and C4 control bits at step 358 for taking the appropriate action, such as requesting a retransmission of the received data, for example. At step 360, the control word detecting subroutine returns to the main program to determine whether four bytes of the data block have been received at step 330.

Figure 12:
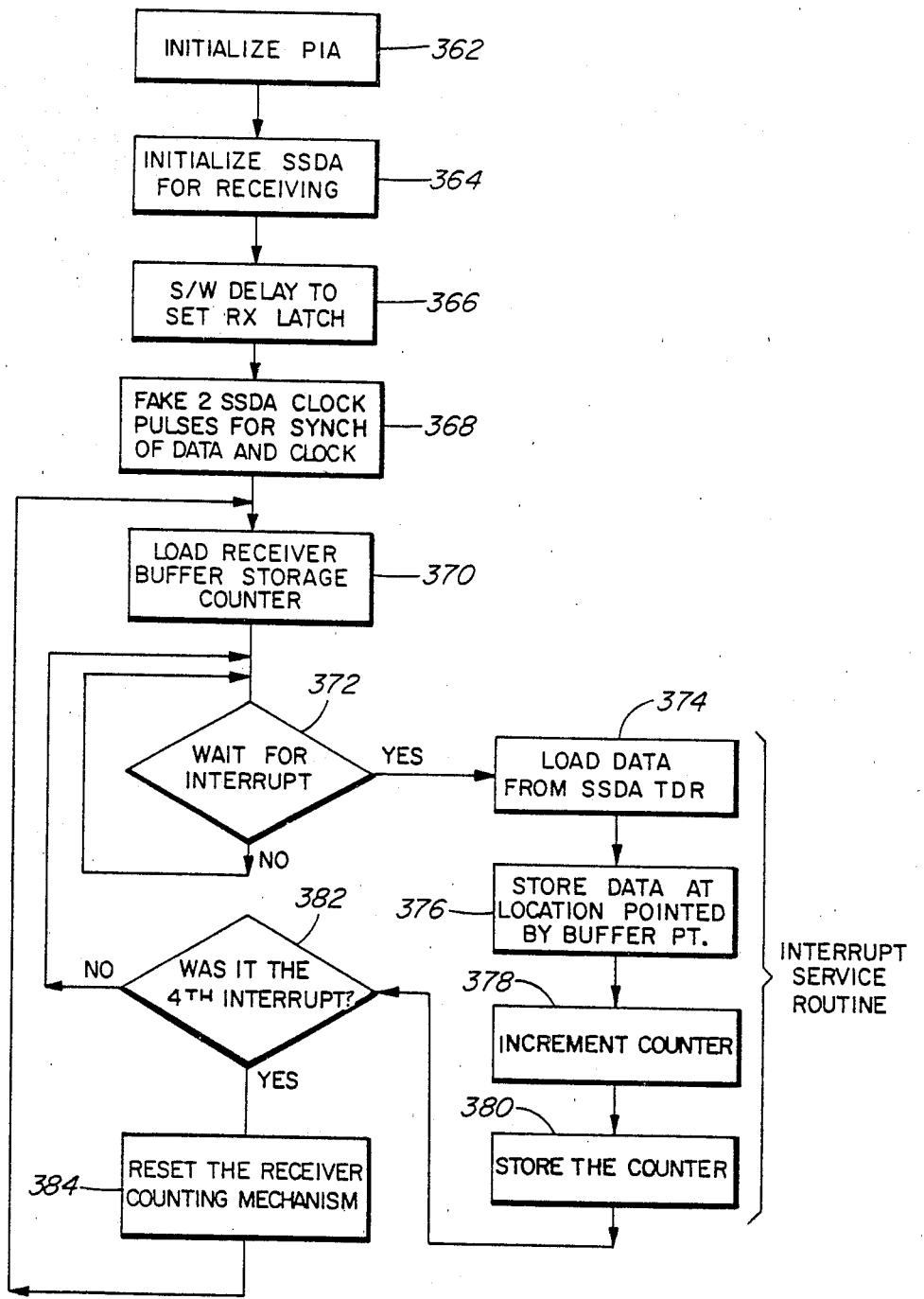

FIG. 12 shows a flow chart for simplex reception of data by the SSDA, with the assumption that no control words are included in the block.

Subsequent to initialization of the PIA lines at step 362, initialization of the SSDA to the receive mode at step 364, and setting of the receiver latch to the appropriate state to set the SSDA in the receive mode at step 366, two non-existent SSDA clock pulses are synthetically generated at step 368 in order to synchronize the data and the clock. The provision of two false clock pulses is necessitated by the fact that immediately following a receiver reset, the SSDA requires ten bits of data before it forms the first byte, and eight bits of data to form each byte thereafter. Thus, the present program enables the SSDA receiver section by clearing the receiver reset bit in control register C1 of the SSDA, and by then providing the two false receiver clock bits by manipulation of line PA6. After this step 368, the SSDA will properly form a byte every eight bits, and appropriately interrupt the microprocessor.

At step 370 the buffer storage counter of the receiver is loaded, and at step 372 the microprocessor awaits an interrupt from the SSDA indicating completion of a byte. Upon the occurrence of an interrupt, the data from the transmitter data register is loaded at step 374 and stored at a location pointed to by the buffer pointer at step 376. The buffer counter is incremented at step 378 and stored again at step 380.

Step 382 determines whether the interrupt was the fourth interrupt received from the SSDA during the present data block. When the fourth interrupt is identified, the receiver counter is reset at step 384 and the program returns to step 370 to continue the receiving operation. For interrupts indicating that fewer than four bytes have been received, the program returns to step 372 to wait for additional interrupts indicating reception of additional bytes of data.

Figure 13:
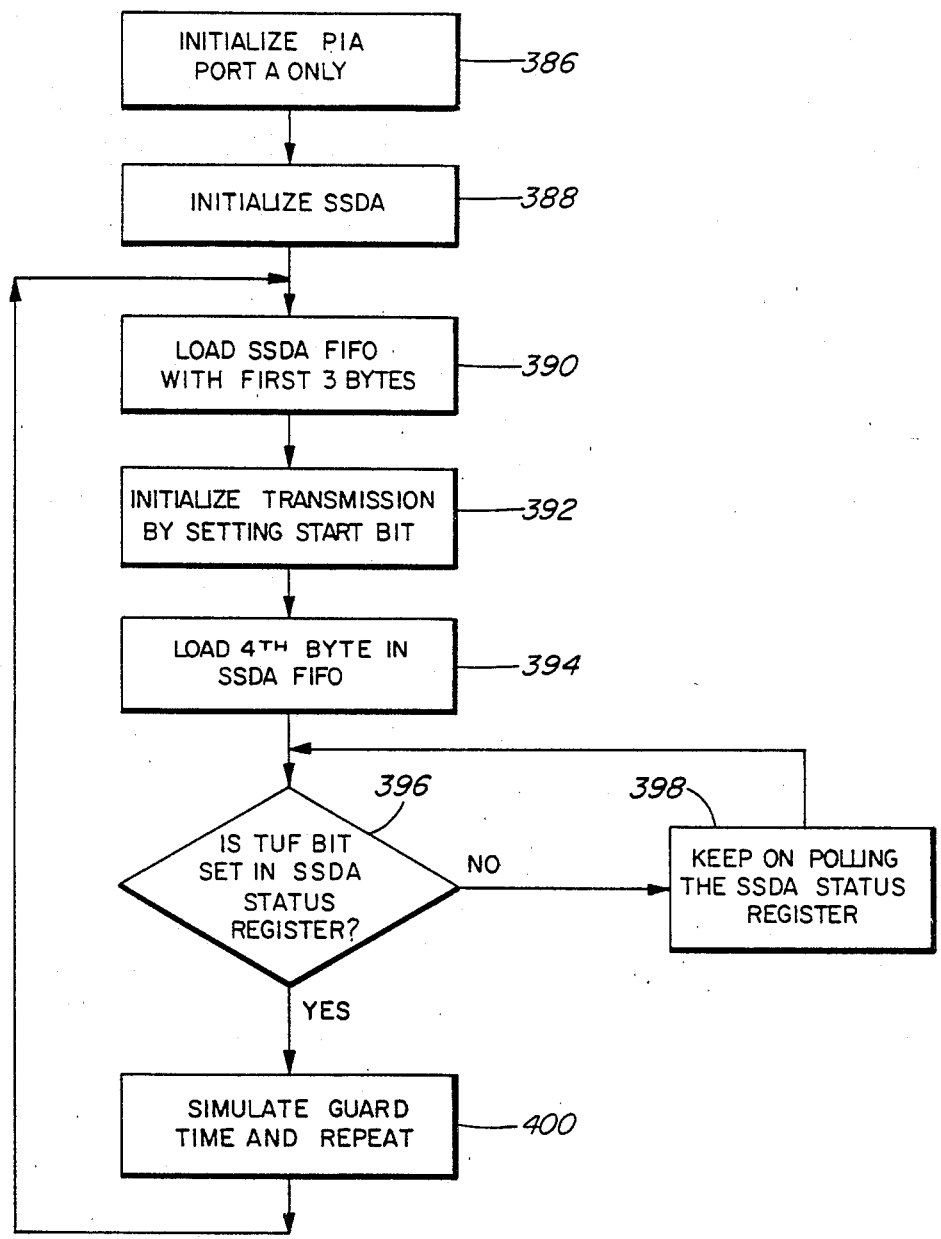

FIG. 13 illustrates a transmission routine in which control word signaling is not used, and in which the transmission is terminated by polling the TUF signal of the SSDA. As previously described with reference to FIG. 4, hardware is presently provided to avoid the need for polling the TUF signal. In the alternative embodiment of FIG. 13, however, port A of the PIA is initialized at step 386, and the SSDA itself initialized at step 388. The 3-byte FIFO of the SSDA is loaded with the first three bytes of a data block at step 390, and transmission is initialized by setting the start bit at step 392.

The fourth byte of the data block is loaded in the FIFO at step 394, and the TUF bit interrogated at step 396. The interrogation continues at steps 396 and 398 until a determination is made that the TUF bit is, indeed, set. At that time the guard time previously referred to is simulated at step 400, and the routine is repeated by transmission of a further block of data.

In accordance with the foregoing description, it is seen that a data set in accordance with the invention provides digital to digital conversion from a low transmission rate to a high transmission rate for full duplex burst communication of fixed length data blocks between a pair of terminals, or between a terminal and a public network, over a single pair of wires. The data set further provides for transmission of control messages and substitution messages for particular data sequences, which are identified by a bipolar violation bit and by a particular multi-bit preamble.

The data set moreover provides for transmission of clock synchronization signals at the beginning of each data block, as well as DC balancing signals at the end of each data block and within each preamble to a bipolar violation bit. A combination of hardware circuits and software control of a microprocessor within the data set are used to provide these and other desirable features of the invention.

The detailed description of the preferred embodiment is intended as an illustration, and not as a limitation of the present invention which is receited with greater particularity in the appended claims. Thus, while various modifications of the invention will occur to those skilled in the art, it is to be understood that such modifications are within the scope of the invention as defined by the following claims:

I claim:

1. Digital to digital converting communication interface for providing high speed, full duplex, burst mode communication of fixed length data blocks comprising:
   (a) transmitting means and receiving means for transmitting and receiving data;
   (b) mode switching means responsive to a mode switching signal for alternately connecting said transmitting means and said receiving means to a communication path having a two-wire line;
   (c) programmable microprocessor control means for causing said mode switching means to alternate between transmit and receive modes when a complete fixed length data block has been transmitted or received;
   (d) first adaptor means addressably connectable to said programmable microprocessor control means for communicating data at a first rate and in a first format with said programmable microprocessor control means and for communicating said data at a second rate and in a second format with said transmitting means and said receiving means;
   (e) digital control logic means for generating a plurality of control signals to control operation of said interface, and for causing said data to be communicated at said second rate and in said second format between said first adaptor means and said transmitting means and said receiving means;
   (f) second adaptor means interfacing said programmable microprocessor control means with said digital control logic means; and
   (g) third adaptor means for connecting data terminating equipment to said programmable microprocessor control means.

2. Digital to digital converting communication interface as recited in claim 1 wherein said transmitting means includes means for transmitting data comprised of a plurality of bits each representing a particular one of a plurality of signal levels, and
   wherein said digital control logic means includes:
   bipolar encoding means for said transmitting means, for transmitting successive bits representing a particular signal value at different voltage levels,
   selectively actuated bipolar violating means for transmitting a violation bit representing said particular signal value at the same voltage level of the last preceeding bit representing said particular signal value; and,
   bipolar violation control means for actuating said bipolar violating means.

3. Digital to digital converting communication interface as recited in claim 2 wherein said bipolar encoding means includes first generating means for generating pulses of a first polarity, second generating means for duplicating pulses output by said first generating means with pulses having an opposite polarity thereto, and multiplexing means for alternately providing pulses from said first and second generating means to said transmitting means.

4. Digital to digital converting communication interface as recited in claim 2 wherein said bipolar violation control means includes responding means for detecting transmission of a particular message and for actuating said bipolar violating means in response thereto.

5. Digital to digital converting communication interface as recited in claim 4 wherein said responding means includes means for detecting a message having a number of consecutive identical bits.

6. Digital to digital converting communication interface as recited in claim 4 wherein said responding means includes means responsive to a particular control message from said programmable microprocessor control means.

7. Digital to digital converting communication interface as recited in claim 4 wherein said digital control logic means includes substituting means, responsive to said responding means, for substituting for the particular message detected by said responding means a predetermined preamble to said violation bit.

8. Digital to digital converting communication interface as recited in claim 7 wherein said substituting means further includes means for generating a balancing bit for inclusion in said preamble thereby maintaining a voltage balance for transmitted messages on said communication path.

9. Digital to digital converting communication interface as recited in claim 7 wherein said digital control logic means further includes counting means for counting a number of bits transmitted in a particular data block, and
suppressing means for preventing said responding means from actuating said bipolar violating means after the counted number of bits transmitted in the particular data block exceeds a predetermined number.

10. Digital to digital converting communication interface as recited in claim 7 wherein said responding means includes detecting means for detecting a message having a number of consecutive identical bits, said substituting means includes a shift register connected for receiving data and for providing output signals to said detecting means, said shift register having a data output terminal.

11. Digital to digital converting communication interface as recited in claim 10 wherein said substituting means further includes selecting means connected to said shift register for selecting between data and special messages for output on said data output terminal.

12. Digital to digital converting communication interface as recited in claim 11 wherein said selecting means further includes multiplexing means for selecting between control signals, provided by said programmable microprocessor control means, and signals representative of predetermined data conditions, detected by said detecting means, to be provided as the special messages output on said data output terminal.

13. Digital to digital converting communication interface as recited in claim 12 wherein said means for transmitting data includes connecting means for connecting data output on said data output terminal to said bipolar encoding means, said bipolar encoding means including first and second generating means for generating output pulses of opposite polarities when said data output on said data output terminal represents a particular bit value, and multiplexing means responding to occurrence of the particular bit value for alternating connection of said first and second generating means for transmission on said communication path.

14. Digital to digital converting communication interface as recited in claim 7 wherein said digital control logic means further includes means for generating start and stop bits preceeding and succeeding said fixed length data blocks, for synchronizing said receiving means and for maintaining a voltage balance for said data blocks, respectively.

15. Digital to digital converting communication interface for providing high speed, full duplex, burst mode communication of fixed length data blocks comprising:
(a) transmitting means and receiving means for transmitting and receiving bipolar encoded data, said receiving means including:
violation detecting means for detecting a bipolar violation bit, and
violation responsive generating means responsive to said violation detecting means for generating predetermined signals;
(b) mode switching means responsive to a mode switching signal for alternately connecting said transmitting means and said receiving means to a communication path having a two-wire line;
(c) programmable microprocessor control means for causing said mode switching means to alternate between transmit and receive modes when a complete fixed length data block has been transmitted or received;
(d) first adaptor means addressably connectable to said programmable microprocessor control means for communicating data at a first rate and in a first format with said programmable microprocessor control means and for communicating said data at a second rate and in a second format with said transmitting means and said receiving means;
(e) digital control logic means for generating a plurality of control signals to control operation of said interface, and for causing said data to be communicated at said second rate and in said second format between said first adaptor means and said transmitting means and said receiving means;
(f) second adaptor means interfacing said programmable microprocessor control means with said digital control logic means; and
(g) third adaptor means for connecting data terminating equipment to said programmable microprocessor control means.

16. Digital to digital converting communication interface as recited in claim 15 wherein said violation responsive generating means includes preamble detecting means for detecting a preamble for the detected bipolar violation bit, and
regenerating means responsive to the detected preamble for regenerating the particular message represented thereby and for substituting the regenerated message for the detected preamble.

17. Digital to digital converting communication interface as recited in claim 16 wherein said preamble detecting means includes interrupt generating means responsive to said violation detecting means for generating an interrupt signal for transmission to said programmable microprocessor control means when the detected preamble of a detected bipolar violation bit represents a control message.

18. Digital to digital converting communication interface as recited in claim 16 wherein said receiving means further includes clock recovering means for detecting data received from said communication path, and for providing the detected data in properly clocked formats to said programmable microprocessor control means.

19. Digital to digital converting communication interface as recited in claim 18 wherein said regenerating means includes a shift register having: a first input for serially receiving the properly clocked data; a second input for receiving a predetermined bit sequence to be substituted for the detected preamble; and a plurality of outputs from various cells of the shift register;
  said preamble detecting means including logic circuitry responsive to said violation detecting means and to the plurality of outputs of the shift register for providing a regenerating signal to said shift register, and
  means associated with said shift register, responsive to said regenerating signal, for entering the predetermined bit sequence from said second input thereof into the cells of the shift register, thereby substituting said predetermined bit sequence for the detected preamble when a bipolar violation bit is detected.

20. Digital to digital converting communication interface as recited in claim 18 further comprising coordinating logic means,
  responsive to said mode switching signal; to control signals from said programmable microprocessor control means; to gated signals from said communication path; and to recovered clock signals,
  for generating a signal to initialize said receiving means.

21. Digital to digital converting communication interface as recited in claim 15 further comprising line receiving means connected to receive data signals from said mode switching means, said line receiving means including means for supplying said data signals to said violation detecting means.

22. Digital to digital converting communication interface as recited in claim 21 wherein said line receiving means includes threshold detecting means for only supplying data signals exceeding a predetermined threshold to said violation detecting means.

23. Digital to digital converting communication interface as recited in claim 21 wherein said line receiving means comprises error detecting means for detecting errors in the received data signals.

24. Digital to digital converting communication interface as recited in claim 23 wherein said line receiving means further includes display means connected to said error detecting means for providing an indication when said received data signals include an error.

25. Digital to digital converting communication interface as recited in claim 23 wherein said error detecting means includes peak detecting means for determining whether said data signals have peak values above a predetermined minimum value.

26. Digital to digital converting communication interface as recited in claim 23 further comprising error correcting means for correction of errors detected by said error detecting means.

27. Digital to digital converting communication interface as recited in claim 26 wherein said error correcting means includes means for causing retransmission of data signals having errors detected by said error detecting means.

28. Digital to digital converting communication interface as recited in claim 15 wherein said programmable microprocessor control means includes storage means for a control program, and means responsive to said control program for testing said receiving means in continuous transmission.

29. Digital to digital converting communication interface as recited in claim 15 wherein said transmitting means further includes means for transmitting a synchronizing start bit prior to transmission of said fixed length data block, and said receiving means includes clock recovery means responsive to said start bit and blocking passage of said start bit to a data receiving terminal.

30. Digital to digital converting communication interface as recited in claim 29 wherein said transmitting means further includes means for transmitting a DC balancing bit subsequent to transmission of said fixed length data block, and said receiving means includes means for blocking passage of said balancing bit to said data receiving terminal.

31. Digital to digital converting communication interface as recited in claim 15 wherein said programmable microprocessor control means is operable for initializing said first adapter means for transmission, and said digital control logic means is operable during a transmission sequence for determining whether a signal to be transmitted represents a control word and for generating a control word interrupt responsive thereto,
  said microprocessor being further operable for determining whether a control word interrupt has been generated and, responsive thereto, for generating a control word including a unique identifying preamble incorporating a bipolar violation for transmission.

32. Digital to digital converting communication interface as recited in claim 15 wherein said programmable microprocessor control means is operable for determining whether a last byte of a data block to be transmitted has been loaded by said first adapter means and, upon such a determination, for initiating a receive operation.

33. Digital to digital converting communication interface as recited in claim 15 wherein during a receive operation said digital control logic is operable for detecting a unique identifying preamble to determine whether a received signal represents a control word and for generating a control word interrupt responsive thereto,
  said programmable microprocessor control means being operable for determining whether a control word interrupt has been generated and, responsive thereto, for decoding said control word.

34. Digital to digital converting communication interface as recited in claim 15 wherein said programmable microprocessor control means is operable for determining whether a last byte of a data block to be received has been received and, upon such a determination, for initiating a transmit operation.

35. Digital to digital converting communication interface for providing high speed, full duplex, burst mode base band communication of fixed length data blocks comprising:
  (a) base band transmitting means and base band receiving means for transmitting and receiving data;
  (b) mode switching means responsive to a mode switching signal for alternately connecting said transmitting means and said receiving means to a communication path having a two-wire line;

(c) programmable microprocessor control means for causing said mode switching means to alternate between transmit and receive modes when a complete fixed length data block has been transmitted or received;

(d) first adapter means addressably connectable to said programmable microprocessor control means for communicating data at a first rate and in a first format with said programmable microprocessor control means and for communicating said data at a second rate and in a second format with said transmitting means and said receiving means;

(e) digital control logic means for generating a plurality of control signals to control operation of said interface, and for causing said data to be communicated at said second rate and in said second format between said first adapter means and said transmitting means and said receiving means;

(f) second adapter means interfacing said programmable microprocessor control means with said digital control logic means; and (g) third adapter means for connecting data terminating equipment to said programmable microprocessor control means.

36. Digital to digital converting communication interface as recited in claim 35 wherein said programmable microprocessor control means is further operable for multiplexing a plurality of signals from a plurality of sources to a single two-wire line.

37. Digital to digital converting communication interface as recited in claim 36 wherein said programmable microprocessor control means is operable to provide time division multiplexing.

38. Digital to digital converting communication interface as recited in claim 5 wherein said digital control logic means includes means for temporary storage of transmitted data.

39. Digital to digital converting communication interface as recited in claim 35 wherein
    said first adapter means is connected to said programmable microprocessor control means via a first connection path,
    said second adapter means is connected to said programmable microprocessor control means via a second connection path, and
    said third adapter means is connected to said programmable microprocessor control means via a third connection path,
    said third connection path being independent of said first and second paths.

40. Digital to digital converting communication interface as recited in claim 35 wherein
    said first adapter means comprises synchronous operating means for communicating said data at a synchronous clocked rate.

* * * * *